(12) United States Patent
Hamadeh et al.

(10) Patent No.: US 7,752,324 B2
(45) Date of Patent: Jul. 6, 2010

(54) REAL-TIME PACKET TRACEBACK AND ASSOCIATED PACKET MARKING STRATEGIES

(75) Inventors: Ihab Hamadeh, State College, PA (US); George Kesidis, State College, PA (US)

(73) Assignee: Penn State Research Foundation, University Park, PA (US)

( * ) Notice: Subject to any disclaimer, the term of this patent is extended or adjusted under 35 U.S.C. 154(b) by 2124 days.

(21) Appl. No.: 10/617,258

(22) Filed: Jul. 11, 2003

(65) Prior Publication Data
US 2004/0093521 A1 May 13, 2004

Related U.S. Application Data

(60) Provisional application No. 60/395,838, filed on Jul. 12, 2002, provisional application No. 60/470,337, filed on May 14, 2003.

(51) Int. Cl.
*G06F 15/16* (2006.01)
(52) U.S. Cl. .................... 709/230; 709/236
(58) Field of Classification Search ............. 709/236, 709/230
See application file for complete search history.

(56) References Cited

U.S. PATENT DOCUMENTS

| | | | |
|---|---|---|---|
| 7,028,335 B1 * | 4/2006 | Borella et al. .............. | 726/11 |
| 7,046,680 B1 * | 5/2006 | McDysan et al. ........... | 370/396 |
| 7,475,426 B2 * | 1/2009 | Copeland, III ............. | 726/23 |
| 2002/0161925 A1 * | 10/2002 | Munger et al. ............. | 709/241 |
| 2003/0035370 A1 | 2/2003 | Brustoloni | |
| 2003/0036970 A1 | 2/2003 | Brustoloni | |
| 2003/0051026 A1 * | 3/2003 | Carter et al. ............... | 709/224 |
| 2003/0145232 A1 * | 7/2003 | Poletto et al. ............... | 713/201 |

(Continued)

FOREIGN PATENT DOCUMENTS

WO   WO 99/48303   9/1999

(Continued)

OTHER PUBLICATIONS

Kim, et al. "ACtive edge-Tagging (ACT): An Intruder Identification & Isolation Scheme in Active Networks" IEEE (2001) pp. 29-34.

(Continued)

*Primary Examiner*—Benjamin R Bruckart
*Assistant Examiner*—Gerald Smarth
(74) *Attorney, Agent, or Firm*—McDermott Will & Emery LLP

(57) ABSTRACT

To facilitate effective and efficient tracing of packet flows back to a trusted point as near as possible to the source of the flow in question, devices on the border of the trusted region are configured to mark packets with partial address information. Typically, the markings comprise fragments of IP addresses of the border devices in combination with fragment identifiers. By combining a small number of marked packets, victims or other interested parties are able to reconstruct the IP address of each border device that forwarded a particular packet flow into the trusted region, and thereby approximately locate the source(s) of traffic without requiring the assistance of outside network operators. Moreover, traceback can be done in real-time, e.g. while a DDoS attack is ongoing, so that the attack can be stopped before the victim suffers serious damage.

37 Claims, 7 Drawing Sheets

U.S. PATENT DOCUMENTS

2007/0047457 A1* 3/2007 Harijono et al. ............. 370/250
2007/0206605 A1* 9/2007 Ansari et al. ............. 370/395.5

FOREIGN PATENT DOCUMENTS

| WO | WO 02/21296 A1 | 3/2002 |
| WO | WO 02/04580 A3 | 6/2002 |
| WO | WO 02/45330 A2 | 6/2002 |

OTHER PUBLICATIONS

Song, et al. "Advanced and Authenticated Markig Schemes for IP Traceback" IEEE INFOCOM (2001) pp. 1-9.
Burch, et al. "Tracing Anonymous Packets to Their Approximate Source" LISA XIV New Orleans, LA (Dec. 3-8, 2000) pp. 313-321.
Stone, Robert "CenterTrack: An IP Overlay Network for tracking DoS Floods" Proceedings of the 9th USENIX Security Symposium Denver, CO (Aug. 14-17, 2000).
Bellovin, Steven, "iTrace" (Work in Progress) Internet Draft by Network Working Group, draft-bellovin-itrace-00.txt (Mar. 2000) pp. 1-5.
Wu, et al. "Intention-Driven ICMP Trace-Back" (Work in Progress) Internet Draft by Internet Engineering Task Force (Feb. 2001) pp. 1-10.
Mogul, et al. "Path MTU Discovery" Network Working Group Request for Comments )RFC) 1191 (Nov. 1990) pp. 1-19.
Ferguson, et al. "Network Ingress Filtering: Defeating Denial of Service Attacks Which Employ IP Source Address Spoofing" Network Working Group Request for Comments (RFC) 2267 (Jan. 1998) pp. 1-10.
Snoeren, et al. "Hash-Based IP Traceback" SIGCOMM'01 San Diego, CA (Aug. 27-31, 2001) pp. 3-14.
Savage, et al. "Practical Network Support for IP Traceback" SIGCOMM'00 Stockholm, Sweden (2000).
Hamadeh, at al. "Packet Marking for Traceback of Illegal Content Distribution" in *Proc. International Conference on Cross-Media Service Delivery* (*CMSD*), ISBN 1-4020-7480-8, Santorini, Greece, May 31, 2003.
Park, et al. "On the Effectiveness of Route-Based Packet Filtering for Distributed DoS Attack Prevention in Power-Law Internets" SIGCOMM'01 San Diego, CA (Aug. 27-31, 2001).
Park, et al. "On the Effectiveness of Probabilistic Packet Marking for IP Traceback under Denial of Service Attack" extended abstract, full paper available as Tech. Rep. CSD-00-013, Department of Computer Sciences, Purdue University (Jun. 2000).
Hamadeh, et al. "Performance of IP Address Fragmentation Strategies for DDoS Traceback" in *Proc. IEEE Workshop on IP Operations and Management* (*IPOM'03*), Kansas City, Missouri, Oct. 1, 2003.
Schnackenberg, et al. "Intrastructure for Intrusion Detection and Response" Proceedings of the DARPA Information Survivability Conference and Exposition (DISCEX) Hilton Head, S.C. (Jan. 25-27, 2000) pp. 1-9.
Doeppner, et al. "Using Router Stamping to identify the Source of IP Packets" CCS'00 Athens, Greece (2000) pp. 184-189.

* cited by examiner

*Fig. 6*
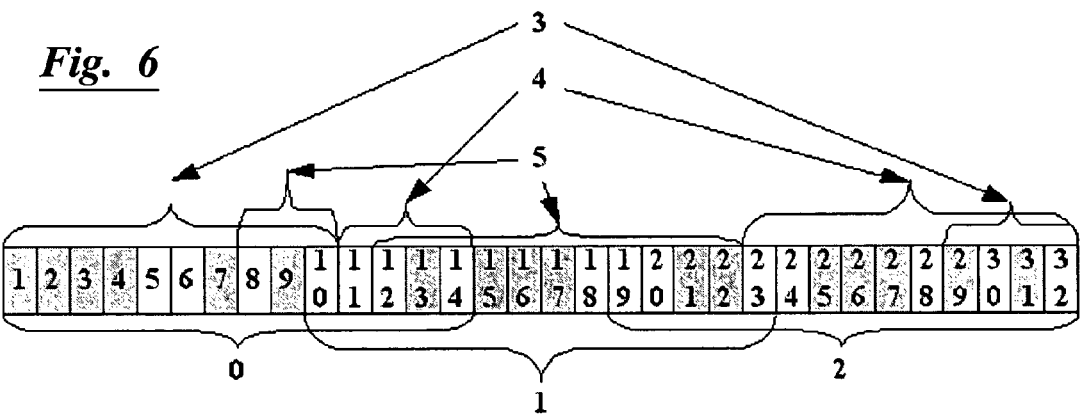
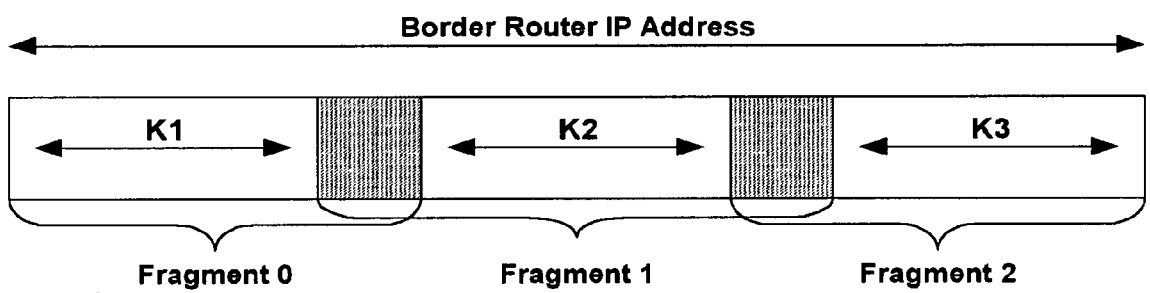
*Fig. 8*
*Fig. 9*
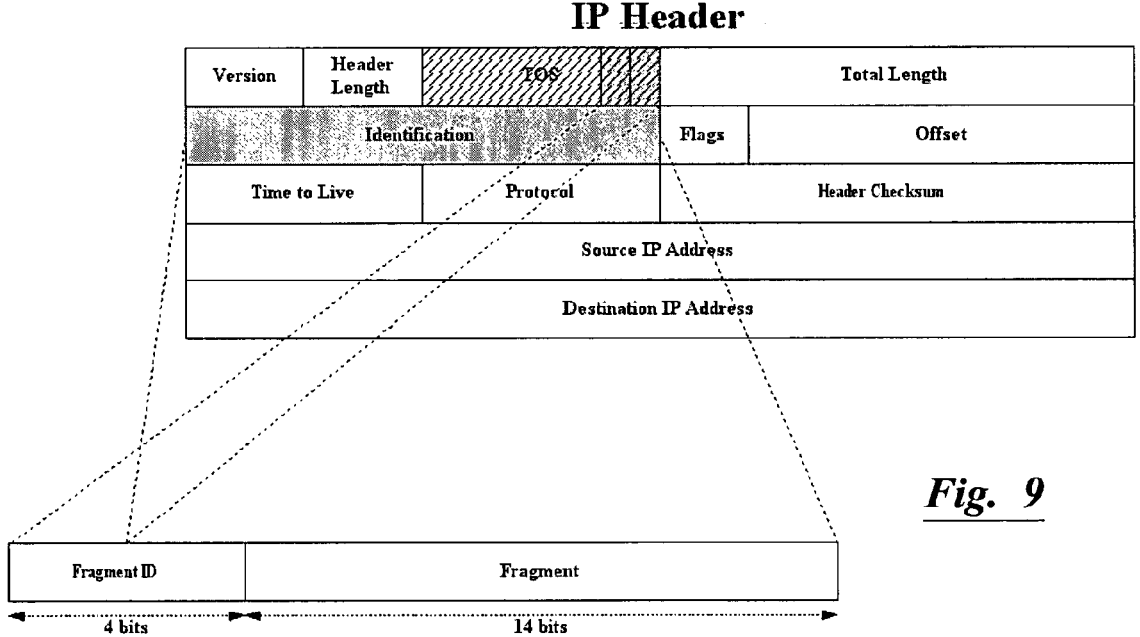

*Fig. 10*
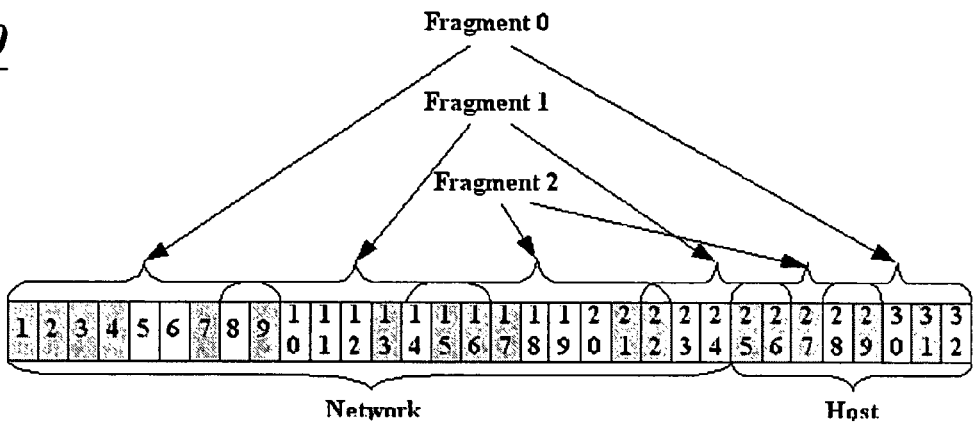
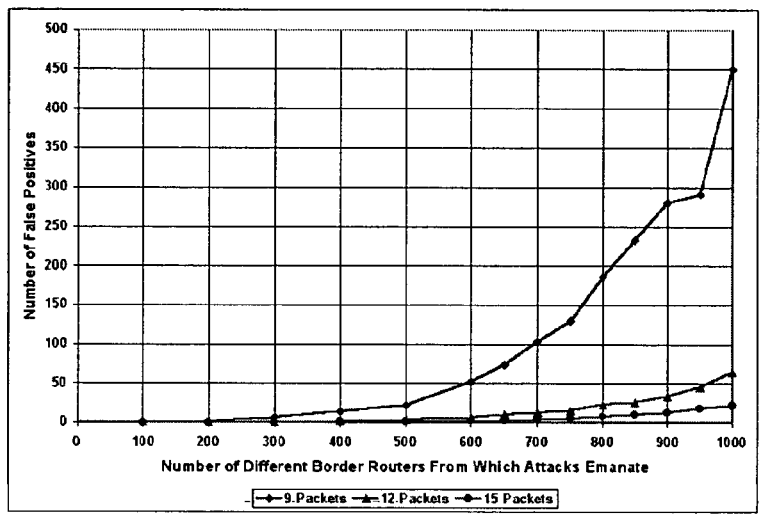
*Fig. 11*
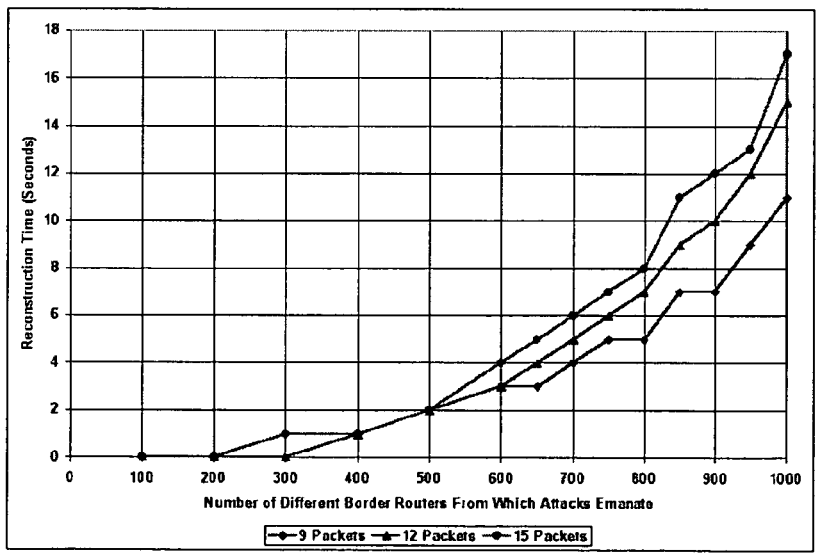
*Fig. 12*

*Fig. 13*
IP Header
| Version | Header Length | TOS | U | U | Total Length | | |
|---|---|---|---|---|---|---|---|
| Identification | | | U F | D F | M F | Offset | |
| Time to Live | | Protocol | | | Header Checksum | | |
| Source IP Address | | | | | | | |
| Destination IP Address | | | | | | | |
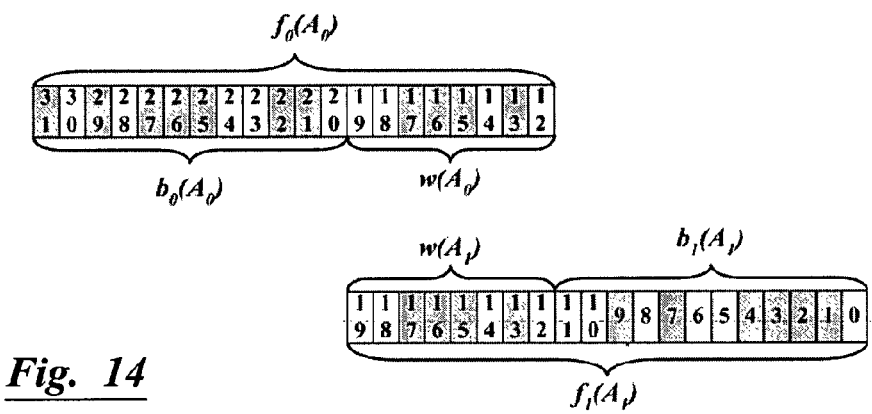
*Fig. 14*
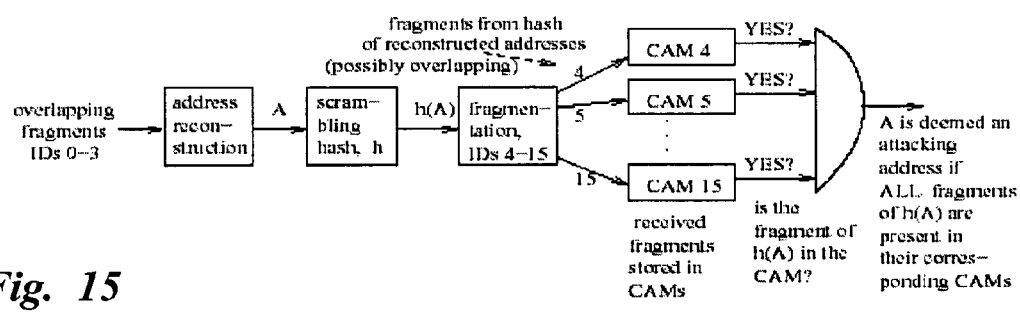
*Fig. 15*

REAL-TIME PACKET TRACEBACK AND ASSOCIATED PACKET MARKING STRATEGIES

RELATED APPLICATIONS

This application claims the benefit of U.S. Provisional Application No. 60/395,838 Filed Jul. 12, 2002 entitled "Realtime Traceback for Distributed Denial of Service Attacks," the disclosure of which is entirely incorporated herein by reference.

This application also claims the benefit of U.S. Provisional Application No. 60/470,337 Filed May 14, 2003 entitled "Packet Marking Strategies for IP Traceback of DDoS Attacks and Spamming and Illegal Content Distribution," the disclosure of which also is entirely incorporated herein by reference.

TECHNICAL FIELD

The present subject matter relates to techniques to traceback sources of specific communications through a communications network, typically in the form of multi-packet communications through a connectionless network, such as the public Internet.

BACKGROUND

Packet-based communications have gained wide acceptance in modern society. With such acceptance has come increasing use in commercial transactions as well as an increase in reliance on such communications. High levels of service availability and high degrees of reliability are absolutely necessary. Any compromise of service causes not only severe inconvenience, but in many cases, severe financial loss to one or more effected parties. Modern communications makes distribution of information extremely easy. This is desirable in many circumstances. However, there are situations where unauthorized dissemination, for example of unauthorized copies of copyrighted materials, is undesirable and even criminal. Consequently, the need to protect the network from certain undesirable or harmful traffic flows and the need to identify sources of illegal content create attendant needs for techniques to identify or traceback sources of packet transmissions.

For example, Distributed-Denial-of-service (DDoS) attacks are growing threats to today's Internet. With the availability of automatic attacking tools such as Tribe Flood Network (TFN), TFK2K, Triboo and Stacheldraht, any person with substantial knowledge about networking can easily carry out a DDoS attack. Some statistics show that DoS (denial of service) and DDoS attacks are so prevalent nowadays that they present a great threat to e-business. Targets of attacks have included even the most recognizable corporations, the White House and the CERT (Computer Emergency Response Team) itself. A single DDoS attack in 2000 is believed to have cost hundreds of million of dollars. In other words, using DDoS attack tools, any person can, within seconds and at no cost, cause millions of dollars of loss.

Because of the damage that such attacks incur on the Internet and on the business of some online companies that profit directly or indirectly from their devoted subscribers or users (Amazon.com, Buy.com, eBay, etc.), there is an immediate need for a real-time mechanism for tracking down the sources of these attacks, to stop attacks as early as possible and to deter future attacks. Determining the source of the attack is, however, not an easy task since attackers use incorrect or spoofed IP addresses. IP address spoofing disguises the true sources of an attack and, more specifically, can make the attacks appear as if they are being carried out by innocent networks and end-systems.

As another example, the illegal exchange of copyrighted material remains an enormous problem in the Internet. Such copyright infringements are facilitated by pervasive peer-to-peer networks which are basically distributed databases. Many such databases contain vast amounts of copyrighted material illegally obtained, possessed and re-distributed. Notwithstanding the past punitive action taken against Napster, the first successful "third party" file distribution system, transmission of copyrighted material still constitutes a significant fraction of the Internet's total traffic burden and accounts for significant lost royalty revenues by copyright holders.

Currently, illegal exchanges of copyrighted material are "openly" negotiated and transferred typically using FTP (file transfer protocol) or HTTP (HyperText Transfer Protocol) over TCP, i.e., the sender's identity is known during the transfer of the file. Once illegal possession and distribution of copyrighted material begins to be actively investigated, however, we expect that transfer of copyrighted material will become more anonymous to prevent traceback to (identification of) the unlawful transmitters of this material into the network (senders). More specifically, we expect that parties involved in such activities, who are implicitly aware of each other's true identities, will typically negotiate an illegal exchange of copyrighted material in the future. For example, the negotiation could be a simple request using the peer-to-peer protocol that is also used to exchange the file itself or through separate email, or even telephone, exchanges. The sending party will, however, then use spoofed source IP addresses in the packets making up the UDP (user datagram protocol) transfer of copyrighted material to the receiving party. That is, the transfer itself is made anonymous in this fashion to protect the unlawful sender's identity in the network layer.

As for the handling of denial of service attacks, illegal content distribution presents (or will soon present) a problem of identifying the source of illegally distributed copyrighted material. To address this problem, we must first assume that a mechanism is in place in the network that can detect flows of illegally copyrighted material through the network. Once discovered, the network can attempt to trace back to the source of the flow (assuming this problem is made nontrivial by the use of spoofed source IP addresses by the unlawful sender). In a similar fashion, traceback of distributed denial-of-service attacks (DDoS) assumes an intrusion detection system (IDS) at the victim end-system has identified that an attack is occurring and which packets are participating it. Alternatively, we can consider a situation where a hoard of illegally possessed copyrighted material is discovered and, based on (feasibly sized) logs of recent internetworking activity of the apprehended user, the sources of the copyrighted material are identified.

Internet users and service providers also must contend with a variety of other insidious activities, for which mitigation strategies would benefit from using an effective traceback scheme. For example, an increasing amount of unwanted e-mails, often referred to as "spam" e-mails, is bombarding most e-mail users. In some cases, the volume of spam e-mails is becoming so large that the service providers' equipment for message storage is becoming overloaded. Often, the high-level source address in the message (Domain Name or the like) is a fake, and the spammers may use IP address spoofing to hide their physical network location. Blocking of spam e-mails would benefit from knowledge of the true source, but any traceback must be effective to circumvent or reduce the effects of IP address spoofing.

To understand the problems and inadequacies of prior approaches it may be helpful to focus on tracing sources of attacks. To mitigate or terminate a DDoS attack, a victim end-system must address the following component problems: determining which incoming packets are part of the attack (intrusion detection), tracing back to find the origins of the attack (traceback) and, finally, taking action to mitigate or stop the attack (at the identified source) by configuring firewalls or taking some other kind of punitive measures. Determining the source of an attack is not, however, a simple task since attackers typically use incorrect or spoofed IP addresses. IP address spoofing can create the appearance that the attacks are being carried out by innocent end-systems. For these reasons, several solutions have recently been proposed to automatically traceback the sources of DDoS attacks and mitigate them. Each proposed approach has, however, certain drawbacks. General criteria for evaluation of traceback techniques include: false positive rates (including those maliciously caused), missed detection rates, computation and communication overhead, deployment complexity, and DoS effects of the firewalls configured as a result of traceback.

One suggested approach to traceback is Link Testing: Input Debugging. In this method, the victim reports an attack to its upstream router, which in response installs a debugging filter that reveals which upstream router originated the attacking traffic. The method is repeated recursively until the ISPs' border routers are reached. However, this method requires a tremendous amount of management overhead and relies on the availability and willingness of the network operators. While such tracing may be done manually, many ISPs have built tools to automate tracing of attacks across their own networks.

Another suggested approach is Link Testing: Controlled Flooding. In controlled flooding, the victim forces selected hosts to flood one by one each incoming link of the router closest to the victim. The victim monitors the change in the attack packet rate and determines from which link the attack is arriving. The method is repeated recursively until an ISPs' borders router are reached. Obviously, this method is not attractive since it can be a form of DoS itself. In addition, the victim needs to have a good, recent and detailed map of the network topology and be able to generate large packet floods on arbitrary network links without causing a form of DoS attack on the links.

By contrast, under the Internet Control Message Protocol (ICMP) Traceback Messages scheme, routers, with low probability, generate a Traceback message (carried in an ICMP packet) that is sent along to the victim. With sufficient number of Traceback messages from enough routers on the path, the victim is able to reconstruct the attack path. The Traceback messages can help to identify the message generator, the link that the traced packet arrived from, or the link it was forwarded on. The Traceback messages provide information on link IDs by including one or more of the following: Router interface identifier on which the packet was received from or forwarded on, IP addresses of the two routers that form the link, MAC address of the two routers that form the link, and Operator-defined link identifier.

The ICMP Traceback Messages scheme appears promising and can be effectively used to traceback the source of an attack or to construct a map of the Internet. Unfortunately, this technique has two drawbacks. One drawback is that this technique generates extra traffic, leading to a less available bandwidth for data traffic. The other drawback is that an authentication problem arises from the fact that attackers may generate fake Traceback messages to hide the source of the real attack traffic, thereby creating another form of attack.

Another proposed traceback technique involves route-based distributed packet filtering (RBDPF). One basic assumption for RBDPF is that ingress filtering is successful in preventing, not just detecting, DDoS attacks. Ingress filtering is not implementable at every gateway, but is possible for coverage of backbone routers. This technique also relies on an assumption that Internet autonomous system (AS) topologies exhibit power-law connectivity. Thus coverage of a small percentage of backbone routers will cover most of Internet traffic.

RBDPF implements ingress filtering on certain critical border routers of the Internet. It functions by analyzing the routes packets used that are abnormal from the routes they commonly would follow. They then can begin to determine which are legitimate transmission control protocol (TCP) requests and which are fake. The strength of RBDPF lies in its ability to trace back to systems spoofing source IP addresses.

The drawback of this scheme is that some fake TCP requests will still flow through, i.e., it is not 100% effective. Moreover, since it is based on ingress filtering, RBDPF suffers from the same weaknesses. An attacker can still spoof source IP addresses from within the range allowed by the provider of Internet connectivity. Moreover, ingress filtering implementation is opposed by some ISPs, especially the larger high-speed providers. Packet filtering increases CPU utilization and measurably lowers throughput leading to potential performance degradation.

The Probabilistic Packet Marking (PPM) scheme requires that a router, with specified probability, inscribes its local path information into the packet header. The victim reconstructs the attack path starting from the packets received from the closest routers moving up to the ISPs' border routers. Two prominent varieties have been proposed: the Fragment Marking Scheme (FMS) and the Advanced Marking Scheme (AMS).

Under FMS, each router's IP address is bit interleaved with its hash value. The resulting 64-bit quantity is split into eight fragments. Each router probabilistically marks an IP packet it forwards with one of the eight fragments. In case of a DDoS attack, the scheme suffers from two drawbacks. One drawback is the high computation overhead, because of the large number of combinations that need to be checked to reconstruct the routers' IP address. Another drawback of this technique is that it produces a large numbers of false positives, because the incorporation of only the hash value of the routers' IP address and because false positives at a closer distance will result in more false positives further away from the victim (where the border routers are).

Under AMS, each router's IP address is hashed into an 11-bit or 8-bit value (according to whether AMS version I or II is used) and probabilistically inscribed in forwarded IP packets. This scheme reconstructs the attack path of hundreds of attackers with few false positives and a small amount of time. However, the major drawback of AMS is the required knowledge of a topological map of the Internet to be able to reconstruct a 32-bit router IP address from the 11-bit or 8-bit hash values.

A major problem with all the probabilistic marking schemes (including FMS and AMS) is that they do not prevent DDoS attacks in real time, i.e., while an attack is on-going. Also, such schemes require up to thousands of packets per attacker to be able to reconstruct the attack path.

Since routers mark in a probabilistic way, the victim will receive many unmarked packets. As the victim is not able to differentiate between these packets and genuine marked packets, an attacker can easily take advantage of that flaw by inserting "fake" links and "fake" distances into the identification fields. They negatively impact users that require fragmented IP datagrams. When a datagram is fragmented, its identification field is copied to each fragment so the receiver can reassemble the fragments into the original datagram. However, a marking router may overwrite this identification field value and hence cause the fragments not to be reassembled. Moreover, a router may mark fragments from different datagrams with the same identification field value causing incorrect re-assembly.

In view of the noted drawbacks, many DDoS attacks remain possible today because no serious preventative measures have been deployed to mitigate them (for instance, prevention against SYN Flood Attack). For this reason, a tool is needed to trace back the origin of an attack and stop it at its source.

As noted, related needs for tracing packet transmissions to their sources arise in other contexts, for example to combat spamming and to trace sources of illegal copies of protected materials. Hence, the traceback tool developed should be readily adaptable to identifying sources of packet flows relating to a variety of different kinds of problems.

SUMMARY

The concepts disclosed herein address the above noted problems with tracing back a packet flow to a trusted point as near as possible to the source. The solution is based on marking packets with partial information reflecting a border device's address through which an attack or other packet flow was first initiated. By combining a small number of marked packets, victims or other interested parties are able to reconstruct the IP address of the border device and hence approximately locate the source of traffic without requiring the assistance of outside network operators. Moreover, traceback can be done in real-time, e.g. while a DDoS attack is on-going, so that the attack can be stopped before the victim suffers serious damage.

The border devices typically are border routers, e.g. on the backbones of trusted autonomous systems, operated by trusted ISPs or the like. The marking function, however, can be pushed further out, for example to edge-routers, or in some cases, to trusted end-user devices. In an end-user device, the "trust" means that the marking functions can not be readily circumvented or turned off. The region of trust may be viewed from different perspectives depending on the traceback context. For example, for a given victim of an attack, the "region of trust" is simply the region of the Internet that is operated by ISPs that are trusted by the victim. For other applications, it may be simply as wide a region of the network that can be defined for marking purposes. In each case, the devices along the defined border are configured to mark at least some packets as they enter the region of trust. It may be preferred in some cases for the border devices to mark all inbound packets. However, for traceback of attacks, it may be preferred for the boundary devices to mark only inbound packets addressed for the user or device that potentially may be attacked.

In addition to the basic concepts of border marking, the disclosure covers certain advantageous strategies for fragmentation of the address, for use in marking and later identifying a packet flow. A fragment could be a complete address, but typically is a smaller portion of the address. Essentially, the marking device breaks its own address into a number of fragments. In certain examples, the resulting fragments overlap, in that at least some bits in one fragment appear in at least another one of the fragments of the particular address.

In several examples, the fragmentation of an address produces two or more fragment groups, each group spanning the entire 32-bit address being applied for marking. For example, one group might utilize sequential portions of the address, whereas the other group might form the fragments using portions of the address with a predetermined offset or separation pattern. Fragments are assigned identifiers, which also are added to the packet. The two types of fragments use identifiers in two different ranges.

Reconstruction from overlapping fragments involves matching the overlapping bits of different fragments to correlate fragments relating to one particular address. If multiple groups of address fragments are used, then similar procedures are used to provide two reconstructions of the marking router's address. If reconstructed addresses from the groups do not match, they are discarded as false positives or other reconstruction errors.

Strategies are also discussed that use a hybrid marking approach. A hybrid-fragmentation strategy involves combining a "scrambling hash" from all or a portion of the address together with the overlapping fragments approach. The addition of a hash serves to decorrelate attacking addresses. The IP address may first be padded before applying a hash function. Instead of a hash, a scrambling function can be used to scramble "padded" IP addresses.

Another marking approach involves using fragments of multiple addresses or "groups" of addresses associated with a marking router. This approach encompasses a number of different combinations of addresses used in the fragmentation and marking process. These include combinations of groups of IP addresses, combinations of groups of scrambled IP addresses, combinations of one or more groups of IP addresses with one or more groups of scrambled IP addresses, combinations of one or more groups of scrambled IP addresses with one or more groups of hashed IP addresses, and combinations of IP addresses with scrambled IP addresses and hashed IP addresses.

Additional address reconstruction strategies may be applied. For example, only fragment IDs taken from unmodified (unhashed) addresses are used for reconstruction. Content addressable memories (CAMs) may be used to store received hash fragments in a hardware implementation.

In an additional example, received hash fragments are sorted according to their identifiers (they can be stored in content addressable memories, one each for each fragment ID, for very efficient cross-check in hardware). A hash is applied to reconstructed addresses and then the result is fragmented as the hash values were by the marking "border" routers. If all such fragments have been received by the victim (cross-check) then the address is deemed "attacking."

The packet data communication network will typically transport Internet Protocol (IP) type packets comprising headers and data. Hence, each marking of a packet will involve inserting the fragment of the network address of the respective border device into a predetermined field of the IP header of the marked packet. The marking of packets, for this or other purposes, raises issues relating to the placement of the marks in the packet. In an IP packet, for example, the header provides only limited fields that may offer marking opportunities. For example, it may be possible to overload obsolete/unused and modifiable fields in the IPv4 packet header, such as the 13-bit Fragmentation Offset field, the Identification field, the two TOS bits, and the one unused Flag bit. Examples of marking strategies therefore use either the Fragmentation Offset field of the IP header or the Identification field of the IP header. However, the marking strategies also encompass use of both the Fragmentation Offset field and the Identification field of the IP header, together. This later strategy allows routers to use complete IP addresses as the fragments inserted into the IP headers.

A principle application of the fragmentation, marking and reconstruction strategies relates to identifying a point of ingress of attacking packet flows into a trusted network space. However, the same or similar strategies may be used to identify ingress points of other types of packet flows. One example of another application relates to traceback of packets carrying spamming type e-mails. Here the victim end-system is a mail server (with medium-term logging). Another application relates to traceback of illegal distribution, such as illegal copies of copyrighted material (with long term logging). Another use relates to sharing/pooling of information. For example, email subscribers contact their mail server identifying spam; the mail server then performs traceback using the marks associated with the identified spam packets. We can also have different servers suffering the same attack at the same time pooling/cross-checking their traceback operations.

The protection through the above traceback features may apply to protect target server systems or end-user systems. Applications are also discussed for implementations that relate to a firewall configuration, for router protection, intrusion detection services (IDS), and to detect a spoofed IP address without domain name service.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 is a diagram of an IP address for a router, showing a specific example of division thereof into six overlapping 14-bit fragments.

FIG. 8 is another diagram of an IP address for a router, useful in understanding effects of different levels of overlap of the address fragments.

FIG. 9 is a diagram showing the fields of the header of an IP packet and representing certain options for overwriting fields of that header with a router address fragment.

FIG. 10 is another diagram of an IP address for a router, useful in understanding an implementation of the division of the address into fragments containing bits from both the network and host portions of that address.

FIG. 11 is a graph of simulation results representing the false positives for the border router packet marking scheme as a function of the number of border routers involved in the attack.

FIG. 12 is a graph of simulation results regarding reconstruction time as a function of number of routers involved.

FIG. 13 is a diagram showing the fields of the header of an IP packet and representing certain options with shading of certain fields of that header to identify fields used for a router address fragment, in another implementation of the marking strategy.

FIG. 14 shows two overlapping address fragments.

FIG. 15 is a process flow-chart, useful in understanding a technique for identifying a reconstructed address as that of a router involved in an "attack."

DETAILED DESCRIPTION

The various systems and methods disclosed herein relate to marking of packets at trusted network nodes and reconstruction of node address, to allow traceback of problematic packet flows. To appreciate implementation, it may be helpful to begin with a discussion of a relevant network.

Figure 1:
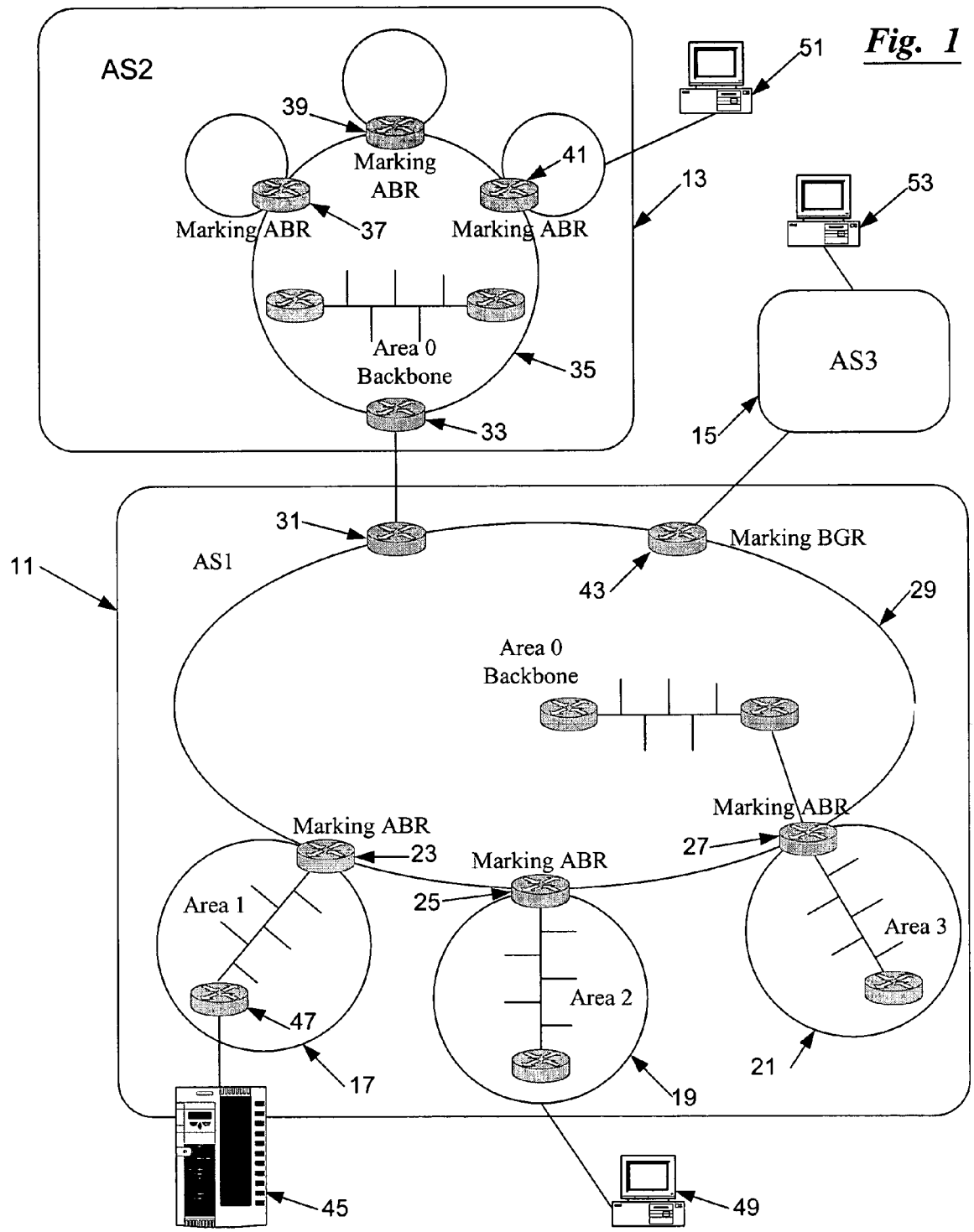
FIG. 1 is a simplified block diagram showing autonomous systems interconnected to form an internet.

FIG. 1 is a simplified illustration of a collection of interconnected packet-switched communication networks, such as might form an intranet or as might represent a segment of the public Internet. For purposes of discussion, assume that the drawing represents the Internet network.

Generally speaking the Internet consists of interconnected networks operated by different entities. Each such separate network is for some purpose an independent or "autonomous" system. An autonomous system is a collection of routers under a single administrative authority, such as a single Internet Service Provider (ISP). Typically, the routers within an autonomous system (AS) use a common interior gateway protocol. The public Internet contains a substantial number of autonomous systems. To simplify the discussion, the drawing shows three interconnected autonomous systems 11, 13, and 15, referred to as "AS1" (11), "AS2" (13) and "AS3 (15) in the drawing.

Within an autonomous system (AS), a number of routers are connected together to form an area. A typical AS includes a backbone referred to as Area 0 and several other Areas. A router is a node between two or more segments or network domains in a packet switched communication network that receives and forwards packets to and from the connected segments or networks. Although similar in general to a packet bridge, a router provides more intelligent capabilities, for example, to select the next hop (and thus the appropriate output port) for each received packet based on programmed policies or routing algorithms. In AS1 (11) for example, the autonomous system includes three regional areas, Area 1 (17), Area 2 (19) and Area 3 (21). Each of the regional areas includes or connects to a router 23, 25 or 27 that provides a packet switched connection into the backbone portion 29 of the autonomous system 11, which is designated as Area 0.

The Autonomous Systems (ASs) are linked by Inter-AS Connections between gateway routers on the respective backbones forming the Area 0 portions of the respective AS networks. For example, in AS1 (11), the gateway router 31 is part of the backbone network of Area 0 (29). The router 31 connects through an Inter-AS link to a router 33 on the backbone section forming Area 0 (35) in AS2 (13). The backbone section forming Area 0 (35) in AS2 (13) also includes routers shown at 37, 39 and 41, which connect into the regional area networks in a manner analogous to the operations of the routers 23, 25 and 27 in AS1 (11). In AS1 (11), the gateway router 43 also is part of the backbone network of Area 0 (29), and gateway router 43 connects through an Inter-AS link to a router (not separately shown) in the Area 0 section within AS3 (15). Additional Inter-AS links and possible additional gateway routers may be provided on the backbone network of Area 0 (29) of AS1 (11), to provide interconnections to other autonomous systems of the Internet.

Information Providers (IPs) and/or enterprise scale users connect to the Internet via high speed lines. As a simplified example, such an entity might operate one or more servers, one of which is shown at 45 connected by a broadband link to an edge-router 47 within Area 1 (17) of AS1 (11). The enterprise server 45 may offer web type communications for content distribution or e-commerce, e-mail communication, etc. The illustrated Internet allows end-users to access the services of server 45 from any terminal connected to the network, represented for example by the personal computers (PCs) 49, 51 and 53 in FIG. 1.

Although currently the most common type, those skilled in the art will recognize that the PC is only one example of the types of terminal a user may operate to communicate via the Internet. Other end-user devices include portable digital assistants (PDAs) with appropriate communication interfaces, cellular or other wireless telephone devices with web or Internet access capabilities, web-TV devices, etc. The various end-user devices may connect into an autonomous system of an ISP, via dial-up or various broadband connections or connect through a corporate Local Area Network (LANs) with a link to an AS.

As noted, a router is a node between two or more segments or network domains. The router 47, for example, is at the edge of Area 1 (17), where the area connects to the customer's network or equipment. The router 23 is connected between Area 1 (17) and backbone Area 0 (29). A gateway router such as 31, 33 or 43 connects between the autonomous systems. Typically, a "border router" or "boundary router" is a router within one autonomous system or ISP network that connects to a different autonomous system or a different ISP network, for example, directly through a peering point or through an Internet exchange. The routers 31, 33 and 43 referred to above as gateway routers would typically be border routers.

However, the "border" router for purposes of the present marking technique are routers designated as the outer limit of an area of interest for marking purposes. In an application for marking for traceback and response to denial of service attacks, such a border router would be a router at the limit of the Internet space that is considered to be trusted, for example, when viewed from the perspective of a target or victim of the attack, such as the server 45. Hence, a border router for marking purposes can be any of the following: border/leaf routers, area border routers (ABR) and/or on gateway/boundary routers depending on the part of the Internet that needs to be secured. In some applications, where an operator or service provider can insure security and trustworthiness, the border marking device can even be a secure end-host or a secure end-user device (in which the marking process cannot be circumvented).

Links within the network can be thought of as having (or being assigned) levels of trust. Routers on the perimeter of a region of trust will mark packets entering the region via ingress links considered as not trustworthy. Typically, each autonomous system has a level of trust. So, links into one autonomous system from an untrusted one are identified as untrusted links; and the border routers mark packets entering via such links. Internal links within a trusted autonomous system are trusted. Hence, a border router will not mark packets passing through and reaching the router from such a trusted link, that is to say, a link that is essentially inside the region of trust.

Consider as an example, a denial of service protective application, from the perspective of a given server 45 that wishes to perform traceback on marked packets to identify a point or points as near as possible to the source. Although the source may not be specifically identifiable, marking can allow the server 45 to identify all border devices that are participating in an attack, that is to say those devices that are forwarding packets relating to the attack into the region of trust toward the destination victim server 45.

To protect the server 45, the entity operating or otherwise responsible for security of that device could identify all of the routers at the perimeter of its trust region and request that those routers mark all packets that are destined for the server 45 under consideration. In the example, assume that the trust region for the server 45 includes the network areas of AS1 (11) and AS2 (13). However, the network areas of AS (15) are outside this trusted region. The server 45 (or a party representing/protecting the server) would request that the routers forming the boundary of this trusted region (boundaries of AS1 and AS2) perform the marking on incoming packets from untrusted systems.

In the example, to reduce the number of marking routers (from that required by the PPM strategies), the marking is performed by selected routers on the backbones or Areas 0 (29 and 35) in the two trusted autonomous systems 11 and 13. The marking could be pushed out to the edge-routers of those AS networks, if desired. In the example, the backbone routers 23, 25, and 27 in AS1 (11) perform marking. It should be noted that the routers in Area 0 need not be connected in a ring configuration. Also, there may be routers in Area 0 that are not perimeter routers, as represented by the "interior" router shown connected to router 27 in FIG. 1. Similarly, the backbone routers 37, 39, and 41 in AS2 (13) perform marking, although interior routers may not. Again, the perimeter routers in Area 0 may (or may not) form a ring network. The gateway routers 31 and 33 do not perform marking, as these routes interconnect the trusted autonomous systems and are not at the outer boundary of the trust region. However, because the third autonomous system AS3 (15) is outside the region of trust for the server 45, the gateway router 43 on the backbone 29 of AS1 (11) is asked to perform packet marking.

In a router, the marking function could be tied to the packet forwarding mechanism of the network processors resident on its input linecards. Therefore, from the perspective of any given server in this more general setting, border router packet marking (BRPM) could be deployed so that all of the routers at the perimeter of a target's trust region mark packets that are forwarded to the target. Traceback under BRPM would, however, be most valuable if all servers had a common "maximal" trust region thereby placing firewalls as close to the true source of an attack as possible (resulting in the smallest denial of service effect to innocent end-systems).

The BRPM scheme advocates two general ideas, how to fragment an address and use the fragments to mark packets, and where in the network and what rules to apply to mark each packet. With regard to where in the network to perform the marking of a packet, an ideal would be if a packet will pass through only one border router on the perimeter of the particular trust region, as defined, on its way to its destination and thus be marked by only one such router. If however, the packet does pass through two border routers, it will be marked by the last one. Ideally, routers will mark all incoming packets bound to destinations for which they are identified as (trusted) marking border routers irrespective of any existing mark on the packet; this is to prevent malicious end-users from inserting phony marks in their attacking packets in order to create false-positives in the address reconstruction by the victim.

FIG. 1 shows an example indicating onto which border routers BRPM can be deployed. Note that marking ABRs may mark datagrams that originate from their associated sub-networks, if routers or end-user equipment on those subnetworks are not considered trustworthy. Referring to FIG. 1, if an attack originated from any area of autonomous system AS2 (13) against end systems in Area 1 (17) of autonomous system AS1 (11), the victims would be able to reconstruct the IP addresses of the area border routers from which the attack emanated. For example, if the attack originates at terminal 51, the router 41 would mark every packet related to the attack. Traceback, by reconstructing the address of the router 41 from the packet marks allows the target at server 45 to identify that source and take immediate steps to mitigate the attack. For example, the server 45 could ask router 41 to institute ingress filtering, to block forwarding of any and all packets from its sub-tending area that carry the destination address for the server 45 that is under attack. Such filtering would deny service to some innocent systems trying to access the target server 45, but only those that enter the trust region via the router 41.

Now assume that autonomous system AS3 (15) does not employ BRPM due to the lack of sufficient levels of technical or political cooperation between Internet Service Providers (ISPs). That entire AS system 15 therefore is outside the region of trust. If a distributed denial of service attack originates from within autonomous system AS3, for example, from a user at terminal device 53, the marking border gateway router (BGR) 43 marks all packets originating from AS3 (15). Hence any end-systems under attack in AS1 and AS2 are able to determine that the source of the attack is coming from A3. For example, if under attack, the server 45 can recognize that the attack is entering its trusted region via the border router 43 by reconstructing the address or addresses of that router from the markings placed in the packets relating to the attack. The server 45 can mitigate the attack, for example, by asking the server 43 to institute ingress filtering on packets coming from AS3 (15), to block incoming packets addressed to the server 45.

As a packet flows through the network in a few cases, it may pass through more than one marking router. If more than one marking router processes a packet, each would write over any mark(s) provided by earlier routers, and the system reconstructing addresses would only trace back to the last marking border router. However, this will typically not be the case. Since the marking is applied only on incoming links from untrusted systems, routers receiving packets via trusted links will not mark those packets. Hence, marking by an ingress router is not overwritten by a later router on the packet's path inside the trusted region. In our example, marked packets forwarded by router 43 may pass through routers 31 and 23 or through routers 27, 25 and 23, on their way to server 45. However, the various links to these routers, in Area 0 of AS1, are all trusted links. Hence, routers such as 23, 25 and 27 will forward marked packets without adding further markings. At the destination, the only mark then would be that provided by the first router to forward the packet into the trusted region.

In the techniques outlined above the marking is performed in routers designated as border routers at the outer boundary of the region of trust (or in other trusted devices at the outer boundary of the trust region). Although persons of skill in the art presumably are familiar with the structure and principles of operation of router platforms, it may be helpful to some readers to briefly summarize relevant aspects thereof.

Figure 2:
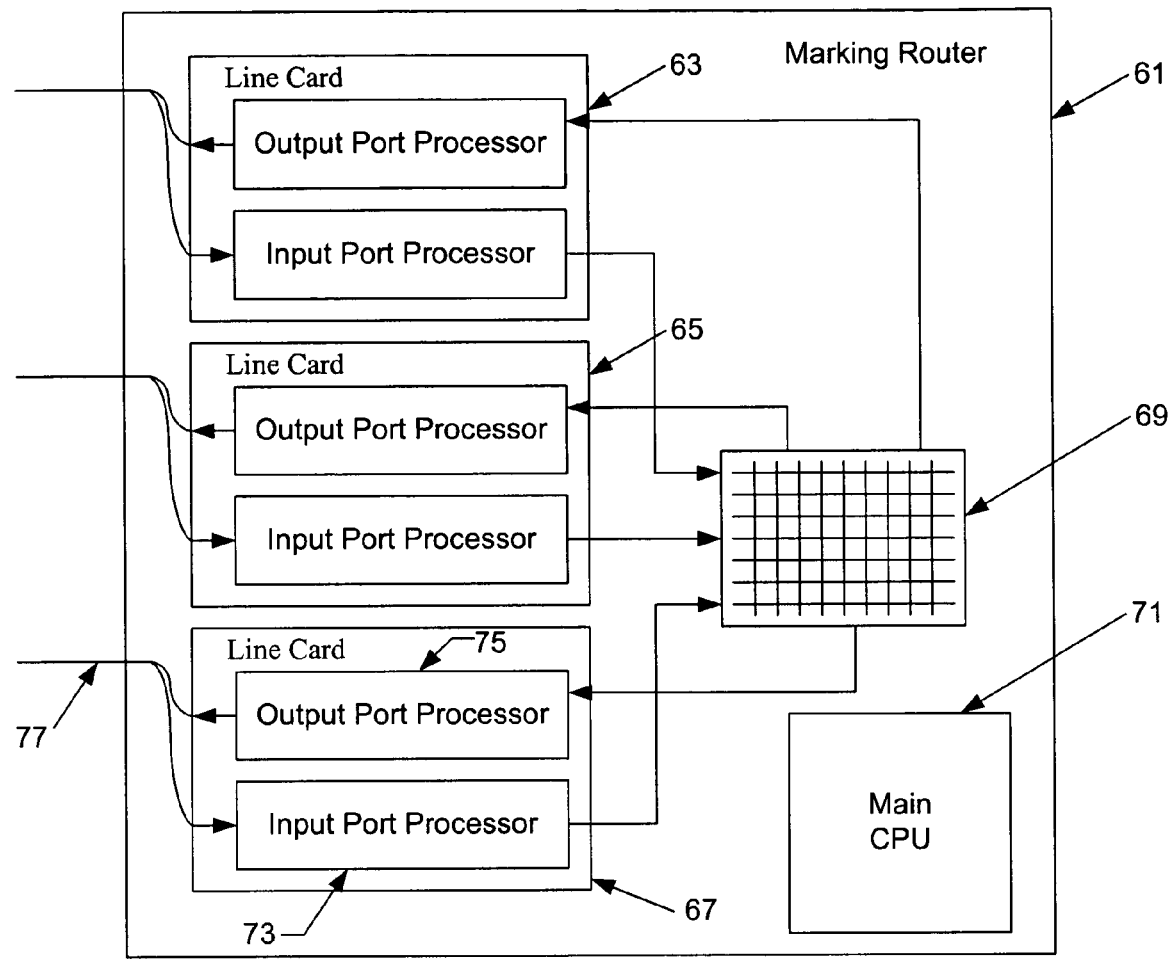
FIG. 2 is a simplified functional block diagram of a router, which may be used for marking of at least selected packets to be forwarded by the router.

FIG. 2 is a much-simplified functional block diagram of a router 61, which may be designated as a marking router. Although the size (number of ports, etc.) and speed may vary depending on the particular application or node in the network of FIG. 1, at which the router operates, the basic structure and functional aspects thereof are substantially similar, at least to the extent necessary for understanding here. As shown in FIG. 2, the marking router 61 includes a number of line cards. Three line cards 63, 65 and 67 are shown by way of illustration, although a router may have as few as two but typically will have more than three line cards. The line cards exchange packets through a switch fabric 69, under general administrative control by a main central processing unit (CPU) 71.

The line cards are generally similar in nature and operation, except that they may differ as needed to allow interfacing to different physical types of links to the respective next neighboring routers and/or to customers' network equipment. For example, the line card 63 may provide a connection to an optical fiber link to another router, whereas the line card 65 may provide a connection to a broadband wireline link to another router; and the line card 67 may interface to a wireless link. Even if the links are physically similar, the line cards may support different operating parameters to provide compatibility with different types of line cards implemented in the remote routers.

At a high level, each line card includes an input port processor and an output port processor, adapted to connect to the particular physical link. By way of example, the line card 67 includes an input port processor 73 and an output port processor 75. The processors provide the physical interfaces for two-way communications via the link 77 and the interfacing to the internal switch fabric 69 to allow exchange of packets through the router 61. The input and output port processors also perform a number of packet processing functions. Of note for purposes of this discussion, the input port processor, for example, processor 73 in card 67, examines the packet headers and makes a number of decisions as to further processing and may perform some header processing, such as labeling of packets. The input port processor therefore is a logical place in the router to efficiently add the marking function for the present traceback operations. Accordingly, it may be helpful to discuss an example of an input port processor 73 (see FIG. 3).

For discussion purposes, assume that the input port processor 73 interfaces to a link 77 to an untrusted system, e.g. in AS3. Hence, this processor will have the capability to mark at least some incoming packets received over the link 77. The input port processor includes a physical layer device or "PHY" 75 for the incoming signals. The PHY (In) 75 provides the actual physical interface to the particular transmission media 77 and any conversions necessary between the physical signals on the media 77 and those utilized within the router 61, e.g. between electrical and wireless. The PHY 75 may perform related protocol conversion functions.

The PHY (In) device 75 supplies converted incoming data signals to a de-framer device 79. The de-framer device 79 converts data frames used to transport packets over the media 77 into another format suitable for further processing within the router 61, for example, to recover IP packets from ATM, Ethernet or SONET type frames. The de-framer device 79 in turn supplies recovered packets to network processor (NP) 81.

Routing of a packet requires a forwarding determination, that is to say a decision of where to send the packet and thus which output port processor should forward the packet on towards its intended destination. The network processor 81 processes the headers of the packets, as the packets are forwarded further into the router 61. For example, the network processor 81 decides onto which output port the packet will be transmitted (forwarding decision). The network processor 81 also updates the TTL (time-to-live) field of each packet and does other classification and policing functions if the packet is deemed to belong to an aggregate "flow" of packets. The forwarding decision is made with the assistance of a ternary CAM (content addressable memory) 83. Essentially, the destination IP address of the packet is applied as an address to CAM 83, and the CAM 83 retrieves the forwarding data corresponding location in memory.

For purposes of the border router marking operations, the CAM 83 could be expanded to decide whether to mark the packet. This decision would be "yes, mark the packet," for example, if the router 61 was a marking router on the perimeter of the trust region of the server 45 whose IP address is the destination address of the packet under consideration. Those skilled in the art will understand that the marking decision could instead be made using a completely different "engine" set up in the network processor 81.

The network processor 81 itself would also perform the marking function. The network processor 81 normally modifies the TTL (time-to-live) field in the IP header, as a matter of standard. The function of the network processor 81 is expanded to overwrite/overload certain fields of the header (as will be discussed later), so as to insert a fragment of the router's address into each packet identified for marking.

The CAM 83 typically functions as a forwarding database for look-up operations, to identify the appropriate output ports for the packets and/or to determine appropriate labels to add to packets. As illustrated, the CAM 83 provides a table lookup for the routing (forwarding) decision. For the traceback operation, the network processor 81 also uses the CAM 83 to determine if marking of each packet is desired. The same or a similar CAM may be used to assist the processor 81 in the fragmentation of the router address and actual insertion of fragments into the packets. Hence, in the example, the CAM 83 also provides one or more tables relating to the decision and implementation of the marking. Those skilled in the art will recognize that a content addressable memory, such as CAM 83, may utilize any desirable form of memory device together with a processor with a software program to cause the memory device and processor to perform the functions of the CAM. In the input processor of a router, however, it may be desirable to implement the CAM as an actual hardware memory device, to optimize performance in the context of the router.

Having made the forwarding and marking decisions, and if appropriate marked the packet, the network processor 81 supplies each packet to a packet memory 85. The packet memory 85 may be used to implement certain labeling, such as labeling a packet with a virtual packet network (VPN) label and VPN identifier tag. An ingress traffic manager chip (iTM) 86 controls the packet memory 85 on the ingress line card. The labeling here is set-up by the ingress network processors first and may be modified by the iTM chips. It should be noted, however, that these labels are only for the inside of the router 61, and each such label is stripped off before the packet is transmitted out of that router.

When the processing of the packet is completed, the packet memory 85 hands the processed packet to an ingress switch interface (iSIF) device 87. The iSIF device 87 processes the packet as necessary to physically hand the packet to the switch fabric 69 for forwarding to and through the appropriate output port processor. The module 87 typically segments and/or merges variable length IP packets, usually those destined for the same output port, into fixed-length frames compatible with the internal switch fabric 69. These frames are switched to the output ports by the switch fabric (core) of the router. The action of the iSIF circuit 87 is undone by corresponding egress modules and/or memory controls, after the fabric hands the frames to the egress line cards.

As discussed above, the input port processor of the router is the exemplary element that will perform the actual marking of packets for traceback. Traceback, however, may be performed in certain trusted devices. Also, the analysis of marked packets includes reconstruction of "source router" addresses, for example as received by a victim of a denial of service attack. The address reconstruction from packet marks may be performed by a mail server or individual client receiving excessive amounts of spam e-mail or a system of a party analyzing packets bearing illegally distributed proprietary content. For example, the reconstruction of the border router (or other border device) addresses from the marked packets may be performed in a server 45 or in an end-user terminal or client device, such as PC 49 (see FIG. 1).

The server 45 is a general-purpose computer device. The nodes of the autonomous systems and/or the server 45 are typically administered from a trusted one or more of the terminal devices 49, 51, 53. Functions of setting up trusted regions and programs for marking as well as traceback through reconstruction and institution of follow-up measures involve operations in the server 45 and/or the terminal device administering the server and/or the network node functions. The hardware of such computer platforms typically is general purpose in nature, albeit with an appropriate network connection for communication via the Internet and/or other data networks that may connect into it. Although persons of skill in the art presumably are familiar with the structure and principles of operation of such general purpose computer platforms, it may be helpful to some readers to briefly summarize relevant aspects thereof.

Figures 4, 5:
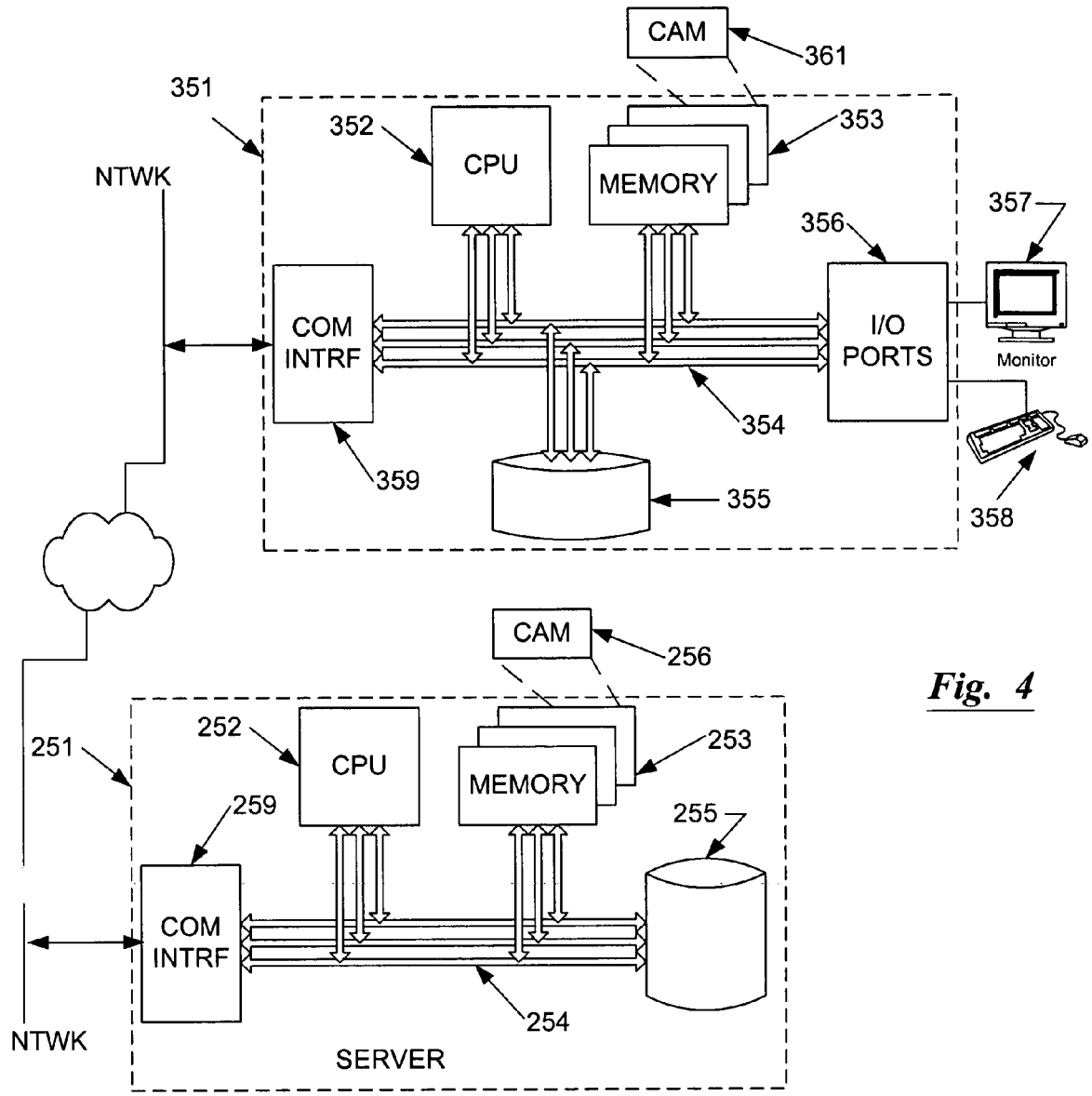
FIG. 4 is a simplified functional block diagram of a server and a terminal device, such as a personal computer or the like, which may be connected to the network of FIG. 1.
FIG. 5 is a diagram of an IP address for a router, showing division thereof into overlapping fragments.

FIG. 4 shows a general purpose computer system 251, which may operate as a server or the like in the network of FIG. 1, for example, as the server 45 discussed earlier. The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of data and of instructions for execution by the CPU 252.

The mass storage may include one or more magnetic disk or tape drives or optical disk drives, for storing data and instructions for use by CPU 252. At least one mass storage system 255, preferably in the form of a disk drive or tape drive, stores the data and programming related to the on-line services available from the server 45. The mass storage 255 may also include one or more drives for various portable media, such as a floppy disk, a compact disk read only memory (CD-ROM), or an integrated circuit non-volatile memory adapter (i.e. PCMCIA adapter) to input and output data and code to and from the computer system 251.

The system 251 also includes one or more input/output interfaces for communications, shown by way of example as an interface 259 for data communications. The interface 259 may be a modem, an Ethernet card or any other appropriate data communications device. To perform as the server 45, the interface 259 preferably provides a relatively high-speed link to the network.

Although not shown, the system 251 may further include appropriate input/output ports for interconnection with a local display and a keyboard or the like serving as a local user interface for programming purposes. Alternatively, the server operations personnel may interact with the system 251 for control and programming of the system from a user device 351, which may be locally connected thereto or connected to the server 251 via the Internet (FIG. 1) or some other network link.

The computer system 251 runs a variety of applications programs and stores relevant data, for its intended network service operations. Of note for purposes of this discussion, the programming includes application software relating to processing of marked packets for traceback, as will be discussed below. If the reconstruction is performed within the server 251, the server memories will include hardware or more likely be used by the CPU 252 to implement a content addressable memory (CAM) 256, which will be used in the reconstruction process. Those skilled in the art will recognize that the computer system 251 may run other programs and/or host a wide range of applications. Also, each system 251 may be implemented as a single computer system or as a distributed system having multiple appearances at different nodes on a network. The programming of the system 351 may also allow communications to remote routers to institute tracing and/or filtering.

FIG. 4 also provides a functional block illustration of a PC or workstation type implementation of a system 351, which may serve as one of the end-user devices 49, 51 or 53. For example, the system 351 may serve as the user terminal 49 of an administrator responsible for programming and security of the system 251 operating as server 45. The exemplary computer system 351 contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of data and of instructions for execution by the CPU 352.

The mass storage may include one or more magnetic disk or tape drives or optical disk drives, for storing data and instructions for use by CPU 352. For a PC, for example, at least one mass storage system 355 in the form of a disk drive or tape drive, stores the operating system and application software as well as data, including received messages and documents, etc. The mass storage 355 within the computer system 351 may also include one or more drives for various portable media, such as a floppy disk, a compact disk read only memory (CD-ROM), or an integrated circuit non-volatile memory adapter (i.e. PCMCIA adapter), to input and output data and code to and from the computer system 351.

The computer system 351 includes appropriate input/output ports 356 for interconnection with a display 357 and a keyboard 358 serving as the respective user interface. For example, the computer may include a graphics subsystem to drive the output display 357. The output display 357 may include a cathode ray tube (CRT) display or liquid crystal display (LCD). Although not shown, the PC type system typically would include a port for connection to a printer. The input control devices for such an implementation of the system 351 would include the keyboard 358 for inputting alphanumeric and other key information. The input control devices for the system may further include a cursor control device (not shown), such as a touchpad, a mouse, a trackball, stylus, or cursor direction keys. The links of the peripherals 357, 358 to the system 351 may be wired connections or use wireless communications.

The system 351 also includes one or more input/output interfaces for communications, shown by way of example as an interface 359 for data communications via a network. The physical communication links may be optical, wired, or wireless (e.g., via satellite network, etc.). For some users, the interface 359 may provide landline-based communications, e.g. via data communication modem or local area network card or the like. However, for other applications, the interface 359 may be a type that provides a mobile wireless communication link. The communication link may be broadband, although there are still many instances today in which the bandwidth of the link to the device 351 is relatively limited.

Each computer system 351 runs an operating system as well as a variety of applications programs and stores data, enabling one or more interactions via the user interface, provided through elements such as 357 and 358, and/or over the network to implement the desired processing for various applications. Of note for purposes of this discussion, if the device 351 serves an administrator associated with or otherwise responsible for the security of the server system 251, then the programming stored in the device 351 includes application software relating to processing of marked packets for traceback and/or follow-up measures, as will be discussed below. If the address reconstruction is performed within the PC device 351, the memories 353 will include hardware or more likely be used by the CPU 352 to implement a content addressable memory (CAM) 361, which will be used in the reconstruction process. The programming of the system 351 may also allow communications to remote routers to institute tracing and/or filtering.

The components contained in the computer systems 351 and 251 are those typically found in general purpose computer systems used as servers, workstations, personal computers, network terminals, and the like. In fact, these components are intended to represent a broad category of such computer components that are well known in the art.

The above discussions and FIGS. 1-4 provide an overview of the traceback and filtering strategies, the network context and the types of equipment that may be used. Next we will consider examples of actual implementations of the marking, which may be used by the border devices.

The Probabilistic Packet Marking techniques were proposed because direct determination of the border router IP addresses is impossible. For example, Probabilistic Packet Marking purportedly overcomes the lack of available space in the IP header, i.e., it is not possible to insert the entire 32-bit IP address of the border router into the IP header. Another reason for using a Probabilistic Packet Marking technique was marking all packets with the address from its 16-bit hash value in the case of Advanced Marking Scheme, or even with part of an address using the Fragment Marking Scheme, would cause unacceptably large numbers of false positives in the address reconstruction. The BRPM scheme proposed herein, however, only requires border routers mark packets, substantially reducing the number of markings and thus the potential from false positives compiled from packets marked by an excessive number of packets.

Probabilistic Packet Marking-techniques are all based on the following assumptions:

An attacker may generate any packet.

Multiple attackers may conspire.

Attackers may be aware they are being traced.

Packets may be lost or reordered.

Attackers send numerous packets.

Routers are both CPU and memory limited.

Routers are not widely compromised.

For BRPM, the idea is to divide a border router's IP address into many overlapping fragments where each fragment has as identifying index (IDs 0 to k−1 in FIG. 5). A border router writes into every marked packet's header a selected fragment and its ID. Fragment selection may be random or deterministic. If all fragments are of the same length, the number of bits needed for storing both a fragment and its ID is at most n+log ⌈k⌉ where n is the fragment size and k is the total number of fragments. This example shows the IP address divided into overlapping fragments. Here, k=7, which means that the address is divided into seven different fragments as actually indicated in this figure).

As discussed in more detail below, the 32-bit IP address is broken down into a number of fragments consisting of a number of bits taken from the address. To facilitate reconstruction, there is an overlap of the address information bits between fragments. Also, each fragment is associated with a fragment identification (ID) number. The fragments and their respective ID numbers are written into packets by the marking router. In several examples, each address fragment consists of 14 bits for the border router marking information and has a 4-bit fragment ID. The size of the overlap may vary, depending on the number of different possible fragments of the address and the available number of bits to overload.

In the addressing scheme of the Internet, a complete source or destination address comprises four numbers separated by dots. This is called the Internet Protocol address, or IP address. An example of the decimal form of an IP address would be 146.190.211.123. 32-bit IP addresses are represented as four 8-bit fields separated by periods. Each such 8-bit field can represent one of 256 numbers, namely 0-255 in decimal notation.

Each machine on the Internet has a unique number assigned to it, in the above-discussed IP address format. There are multiple "classes" of IP addresses. In one class, for example, the first 24 (most significant) bits represent a "network" (the network portion of the address) and the last 8 bits represent the "host" portion of the address (so that, for each network of the class of addresses, there are at most 256 host devices participating in it).

FIG. 6 provides a more detailed illustration, of a 32-bit IP address for a border router, which is divided into overlapping 14-bit fragments. The first fragment (Fragment ID=0) consists of bits 1 to 14. Similarly, the second fragment (Fragment ID=1) consists of bits 10 to 23, whereas the third fragment (Fragment ID=2) consists of bits 19 to 32. As such, the first three fragments comprise overlapping but otherwise sequential portions of the 32-bit address. In the example, another set of three fragments is constructed from non-sequential portions of the 32-bit address. Hence, in the example, the fourth fragment (Fragment ID=3) consists of bits 1 to 10 and bits 29 to 32. The fifth fragment (Fragment ID=4) consists of bits 11 to 14 and bits 23 to 32, whereas the sixth fragment (Fragment ID=5) consists of bits 8 to 10 and bits 12 to 32. This example assumes a 14-bit fragment and 5-bit overlaps, however, fragments of other lengths and other sizes/arrangements of overlaps may be used.

Figure 7:
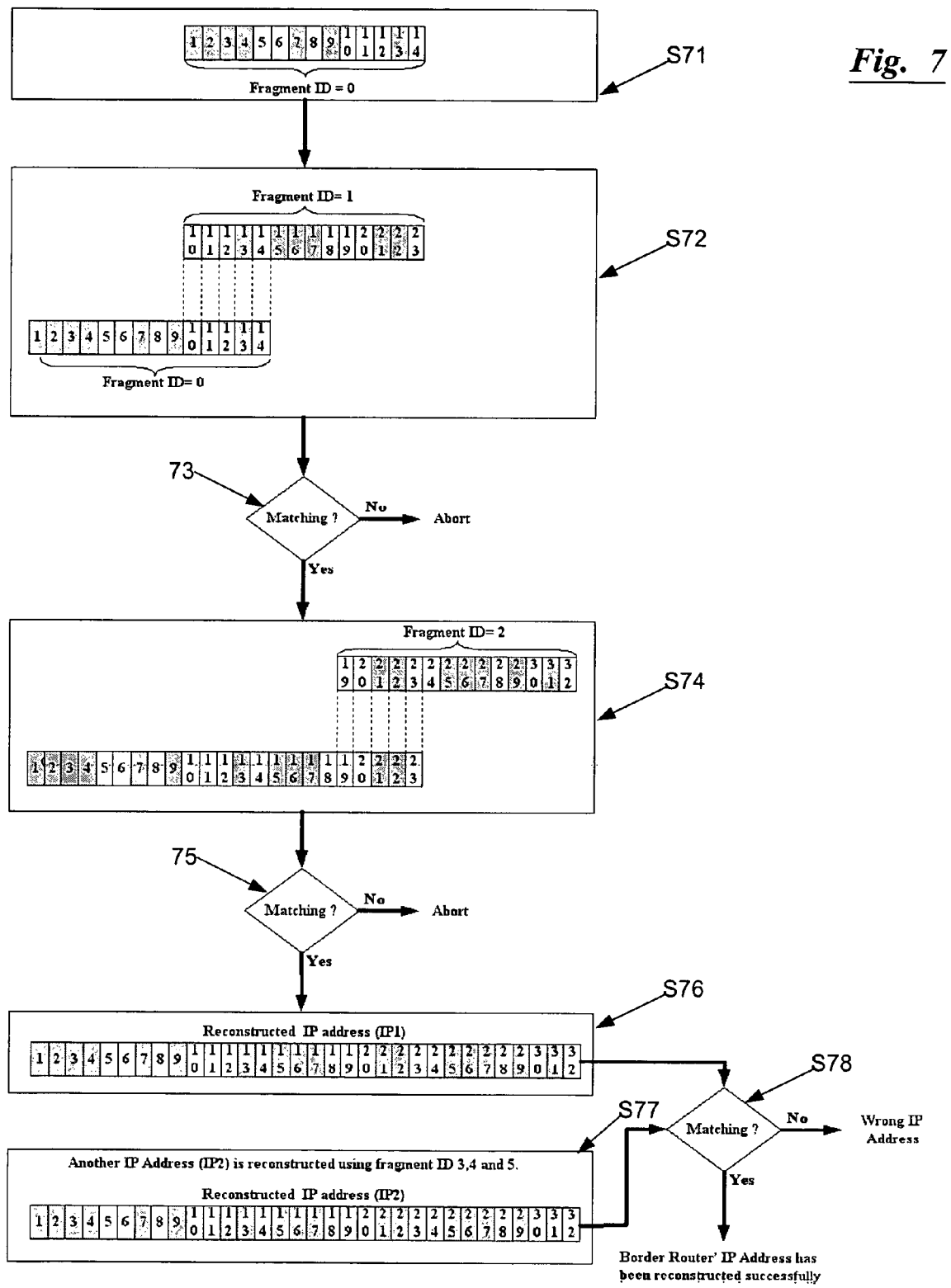
FIG. 7 is a process flow-chart, useful in understanding a technique for reconstructing IP addresses of routers from fragments contained in received packets.

An intrusion detection system or the like will recognize the fragments of a particular flow to be processed for traceback, for example, packets that are parts of a DDoS attack. The detection triggers the reconstruction algorithm processing of those fragments, for example, as shown in FIG. 7. Typically, as packets arrive, fragments are logged. Processing will wait until enough fragments are received because the intrusion detection system requires quite a few packets (or fragments) that are malicious (i.e. part of a DDoS attack) to be able to determine that the server is under attack. After detection, the reconstruction algorithm is run on these malicious fragment instances already logged into the system. The reconstruction is able to determine the source of a DDoS attack within few minutes of its launch and while the attack is still ongoing, since DDoS attacks last for tens of minutes up to many hours. Hence, the reconstruction for traceback provides real-time identification of the addresses of routers involved in the attack. Alternatively, packets could be processed, and fragments run through the reconstruction algorithm, as the packets arrive at the destination.

The victim reconstructs all possible complete border router IP addresses consistent with the address fragments drawn from received and identified packets. Recall that packets from a number of different border routers can simultaneously participate in a DDoS attack and that source IP addresses can be spoofed. Spammers and sources of illegal content may also use IP address spoofing. For this reason, overlapping fragments were used to allow the victim to correlate fragments belonging to the same IP address. Referring to the example given with n=14 and k=6 (FIG. 6), the straightforward reconstruction algorithm used by the victim is shown in FIG. 7. Fragments numbered 0, 1 and 2 are grouped together to form the different border routers' IP addresses. Note that only fragments that do correlate according to the overlapped bits are grouped to form a set IP addresses $S_1$ Using the same method, another set of IP addresses $S_2$ are reconstructed from fragments numbered 3, 4 and 5. Each set $S_1$ and $S_2$ contains the valid IP addresses of the border routers from which the attacks emanated, in addition to invalid IP addresses (false positives) that were reconstructed because the overlapping portion matched. To reduce the number of false positives, set $S_1$ is compared with set $S_2$, and the IP addresses that are common to both ($S_1 \cap S_2$) are those deemed to be border routers from which the attacks originated.

An instance of a fragment is a portion of an actual address used to mark a packet, and is taken from a predetermined set of bit positions of the IP address. It should be noted that the fragment identifiers contained in the marked packets indicate which address bit positions the fragment instances constitute. Hence, in the specific example of FIG. 7, the first fragment instance (Fragment ID=0), stored in step S71, contains the bits from a first fragment (bit positions) of the device address. When the next fragment instance is analyzed in step S72, the system performing the reconstruction attempts to match the first five bits of the next fragment instance with the last five bits of the previously processed fragment instance (or of other logged instances if more than one earlier instance has been logged). In the example, the first fragment instance contains the bits 1 to 14 and the second fragment instance (Fragment ID=1) consists of bits 10 to 23. Bits 10-14 should appear in both fragments instances. If these two instances are from the first and second fragments of an address as shown, the bits do match, the match is recognized in step S73, and the combination (metafragment) of the two fragment instances is passed on for further processing. The non-overlapping bits of the second fragment instance are concatenated with the complete first fragment instance. If the compared bits do not match, the reconstruction is aborted after step S73.

In step S74, another fragment instance is analyzed, and the processing attempts to match and combine that instance with the combination reconstructed from the first and second fragment instances (and/or to other stored instances of address metafragments constructed earlier). As noted, the second fragment instance (Fragment ID=1) consists of bits 10 to 23. The third fragment instance (Fragment ID=2) consists of bits 19 to 32. If the fragment instances are from the same router address, the overlapping bits 19 to 23 should match. If this newly processed fragment instance is a part of the same address as the portion reconstructed from the first two fragment instances, the overlapping bits do match, the match is recognized in step S75, and the combination is passed on for further processing. However, if the compared bits do not match, the reconstruction is aborted after step S75.

The output at S76 contains all 32 bits of a reconstructed IP address (IP1), in this case, that of a marking border router. Although not shown in detail, a similar method is used to process each fragment instances and reconstruct another address (IP2) from fragment instances with identifiers 3, 4 and 5, as produced in step S77 in the flow-chart. The resulting IP addresses IP1 and IP2 are compared in step S78.

The illustrated steps S71 to S77 are repeated so as to construct two sets of IP addresses for border routers involved in the packet flow under investigation, for example, involved in a particular DDoS attack. One set of IP addresses S1 are reconstructed from fragments numbered 0, 1 and 2, whereas the other set of IP addresses S2 are reconstructed from fragments numbered 3, 4 and 5. Each set S1 and S2 contains the valid IP addresses of the border routers from which the attacks emanated, in addition to invalid IP addresses (false positives) that were reconstructed because the overlapping portion matched. To reduce the number of false positives, set $S_1$ is compared with set $S_2$ (step S78); and the IP addresses that are common to both $(S_1 \cap S_2)$ are those deemed to be addresses of border routers from which the attacks originated. Any non-matching addresses are discarded.

The example of FIG. 7 addresses reconstruction of a single address from a small number of fragments for convenience and ease of understanding. Those skilled in the art will recognize that in an actual application the processing would analyze a much larger number of logged fragments to find matches, progressively build metafragments, and so on, to reconstruct complete IP addresses of a substantial number of marking border routers.

As noted above, the reconstruction of the border routers' IP addresses can be done either in software or in hardware using a Content Addressable Memory (CAM). In actual processing, the CAM will contain all IP addresses under construction; an incoming fragment's overlapping bit fields are compared to all resident IP addresses (entries) in the CAM; and then the remainder of the fragment is written into the CAM at all those entries where matches occurred.

Unlike all Probabilistic Packet Marking schemes, the proposed Border Router Packet Marking scheme does not require any router to perform any computation. Moreover, only border routers need to inscribe some information into the headers of packets they forward into the Internet. A router may so mark all packets forwarded into the trusted region; or the router may mark only those packets forwarded into that region with a particular characteristic, typically addressed to an identified destination or containing a particular type of content. As noted earlier, a marking router will no re-mark a previously marked packet. In addition, BRPM is simple to implement since it only requires the addition of a write and a checksum update, which is already performed by routers to update the time-to-live (TTL) field at each hop.

At the victim side, the reconstruction algorithm requires some computation (unless a CAM is used). The amount of computation depends on the size of the fragment and the IP address of the attacker. Let k'<k be the minimum number of fragments needed to completely cover the 32-bit IP address (e.g. in FIG. 6, k'=3).

The complexity of the IP address reconstruction algorithm is as follows. Referring to FIG. 8, the worst case occurs when: (a) the overlapping bits (shaded) are common to all edge-routers that the attacks are emanating from, and (b) all non-overlapping bits are different to each edge-router. In that case, the total number of different edge-routers from which the attacks can emanate is $n \leq 2^{k_1+k_2+k_3}$. If condition (a) and (b) are met (i.e. the worst case), the number of different edge-routers' IP addresses that can be built is $O(n^{k'})$.

Under the BRPM scheme, traceback requires a very small number of packets per attacker. Unlike the probabilistic schemes that require up to thousands of packets per attacker, under BRPM only on the order of tens of packets from each attacker are sufficient to reconstruct the IP addresses of border routers through which the attacking packets emanate.

FIG. 9 is a block diagram of the contents of an IP packet header, showing the standard fields. As mentioned previously, the number of bits occupied in a packet header by the fragment and its ID are n+log⌈k⌉. The Identification field and the two unused bits of the ToS field can be "overloaded", i.e. can be overwritten by the marking fragment and its ID, as also shown in FIG. 9. Alternatively, the fragment "Offset" field can be overloaded instead of the Identification field, if needed.

The problem of finding the best combination of bits to minimize the number of false positives using real border IP addresses was studied. For instance, some border routers have in common the network portion of their IP addresses; therefore, the fragments will be designed to overlap in the host portion of the border routers' IP addresses. FIG. 10 shows an IP address, and another form of address fragmentation. We assume the 32-bit IP address consists of a network portion (24-bits) and a host portion (8 bits).

In the example of FIG. 10, each fragment includes some bits from the network portion and some bits from the host portion. The overlapping bits reside in both the network and host portions of the IP address. Depending on the policy adopted, more bits could be overlapping in the host portion than in the network portion thereby reducing false positives when the host portion alone discriminates the majority of border router IP addresses under consideration.

A simulation was conducted for an n=14 bit fragment size and for different numbers of fragments: k=9, k=12 and k=15. Border router IP addresses were generated at random. Each IP address was split into 14-bit fragments. After running the simulation, all border router IP addresses were successfully reconstructed (0% missed detection) along with few false positives depending on the number of different border routers from which attacks emanate. FIGS. 11 and 12 show the number of false positives and the overhead computation respectively for the BRPM. The simulation was run on an 800 MHz Pentium III Linux workstation.

Recall that the number of bits occupied in a packet header by the fragment and its ID (i.e., the packet's "mark") are n+log⌈k⌉. Potential regions in the IPv4 header that can be "overloaded" (overwritten) include: the Fragment Offset field, the two unused bits of the ToS field, the Identification field, and the single additional unused/unspecified Flag bit (see FIG. 13).

In this section, we describe compatibility issues related to implementation of BRPM by overloading the 16-bit Identification field and/or 13-bit Fragment Offset fields, specifically backwards-compatibility for IP fragment traffic and for IPSec. In the subsequent discussions, we assume that only the Fragment Offset field is available. It should be noted that if both fields are available, nearly the entire IP address of a marking border router could be used to mark each packet.

Unlike the Identification field, that is set by the sending end-systems, the Fragment Offset field is set by the "fragmenting" routers operating within the Internet. In normal IP communications, a fragmenting router breaks large packets down into packets (fragments) of a smaller size. This step is necessary if subsequent routers cannot handle the complete packet's size. The Fragment Offset field is used to specify the offset in the original datagram of the data being carried in each respective fragment, to help in the later reconstruction of the entire packet from the fragments.

Under IP, fragmented datagrams are reassembled at the final host end-system instead of being reassembled immediately after passing across a network with small maximum transmission unit (MTU). The destination end-system uses both the Identification (unique for each datagram) and the Fragment Offset fields along with the source address to identify which fragments belong to which datagrams. Reassembling fragmented datagrams at the ultimate destination has two disadvantages. First, even if some of the physical networks encountered after the point of fragmentation have large MTU capability, only small fragments traverse them resulting in poorer transmission efficiency, i.e., the ratio of payload size to packet (header+payload) size. Second, the probability of a datagram loss increases when fragmentation occurs because the loss of a single fragment results in the loss of the entire packet.

To avoid fragmentation, newer implementations use path MTU discovery. If a TCP device sends all the datagrams with the DF ("don't fragment") bit set and if a router that receives a datagram of this session whose size exceeds the destined outgoing link's MTU, then the router will generate an ICMP "destination unreachable, fragmentation needed but DF bit set" error message and drop the packet. As a result, the TCP device under consideration will decrease the amount of data it sends per datagram and retransmit the dropped packet. Moreover, many applications that use UDP (DNS, RIP, TFTP, BOOTP, SNMP) prevent the application from generating IP datagrams that exceed the minimum reassembly buffer size, which is the minimum datagram size that the standard guarantees that any implementation must support, namely 576 bytes.

Recent measurements suggest that less than 0.3% of packets are fragmented. Thus, the real-estate in the IPv4 header reserved for this function is largely unused and will, in the future, be used even less with the deployment of new routers that do not have such limits on their MTU.

Issues of backwards-compatibility for IP fragment traffic are already known to be problematic for other kinds of marking schemes that suggest overloading the Identification field. Note that, under the probabilistic schemes, many more routers are potentially involved in the marking process than under the BRPM. Yet, backwards compatibility for IP fragment traffic is not a problem for BRPM if it uses the ID field.

Overloading the Identification field would currently be incompatible with parts of IPSec. The Authentication Header (AH) provides cryptographic protection for the packet Identification field and hence routers cannot conveniently alter this field. One solution is to have the AH take the Identification field to be zero as it does for mutable fields such as ToS, TTL and Fragment Offset. This would require a "patch" at the end-systems that require the use of the IPSec Authentication Header. It is possible that at some future time, however, the AH will be eliminated.

Since the Internet Exchange Key (IKE) is used to negotiate the IPSec protections and the related secret keys, this serves to bind participants' addresses to the keys, effectively authenticating these critical IP header fields.

The AH processing, faced with the necessity to distinguish between mutable and non-mutable IP header fields, is more complex than that required for Encapsulating Security Payload (ESP).

Alternatively, BRPM could overload the Fragment Offset field. In this case, only the backwards-compatibility issue for IP fragment traffic spawned within the Internet is to be dealt with. Fortunately, the solution to this problem is simpler.

When a router decides to fragment a packet, it could copy the 13-bit Fragment Offset field that contains the border router marking information. It would then fragment the packets as required and append the border router marking information to the end of the last packet fragment's payload. When an end-system decides to reassemble packet fragments, it will retrieve the border router marking information from the end of the last fragment. This would require a significant patch to the operating system's IP stacks of both routers and end-systems.

Another alternative is to let the border router set the DF bit, hence avoiding fragmentation and letting the application decrease the amount of data it sends per datagram in case the datagram encounters a smaller link MTU.

Note that when a router sets the Fragment Offset field as part of a datagram fragmentation process (involving a MTU limit), the Flag's unused bit in the IP header is typically reset to 0. BRPM could deliberately set this bit to 1 to then allow a device to discriminate between a Fragment Offset field overloaded under BRPM or by the normal MTU-associated datagram fragmentation operation. To avoid such a relatively simple patch in the end-system IP stacks, a perimeter router executing the address reconstruction process as part of traceback could retrieve the mark and then zero-out both the Fragment Offset field and the Flag's unused bit of the packet, before forwarding the packet to the destination end-system. It would be easy for both destination end-systems and interior routers to differentiate between fragmented IP datagrams (Flag's unused bit is 0) and marked IP datagrams (Flag's unused bit is 1). If direct communication with interior routers is required, there may be a need to patch interior router's IP stacks or disable the border router's marking function while performing such communication.

Since the BRPM scheme promises the important ability to determine the border router from which emanated a flow of malicious packets (including those that form part of a DDoS attack), modification of IP's packet fragmentation and reassembly mechanism, as described above, may be justified.

Because the number of bits available to represent the fragments and their IDs is reduced by 3 bits (16–13) if the Fragment Offset field is used, the complexity of the BRPM algorithm will be higher (to meet the same low number of false positives). Therefore, the time required to reconstruct the IP addresses of the border routers from which the attacks emanate may increase. More precisely, in our previous method description, the 16-bit Identification field and the last two bits of the ToS field are overloaded (for example, with 14 bits for the border router marking information and 4 bits for the fragments' ID). If the 13-bit Fragment Offset field and the last two bits of ToS field are overloaded instead, only II bits are used for the border router marking information and 4 bits are used for the fragments' ID (i.e. to keep the number of fragments same).

With the attendant filtering, the proposed Border Router Packet Marking scheme is a simple packet marking strategy that can defeat most, if not all, kinds of Distributed Denial of Service attacks that are prevalent today. The BRPM scheme offers significant enhancement to the Internet security and numerous advantages One advantage is that tracing back the source of an attack is simplified dramatically and can be done in real time, i.e., while a DDoS is on-going. The traceback software employed by potential victim end-systems is not complex, does not require any knowledge of the Internet topology and addressing structure, and can cope with source IP address spoofing. Another advantage is that few packets from each attacker are required to reconstruct the source IP address of the attacker's border router. Few false positives may result. Since traceback is carried out in real time, the victim is able to completely stop an attack at its sources before significant damage occurs. Simulation results indicate that under the BRPM scheme, border router IP addresses from which attacks emanate were determined in few seconds if not less than a second. BRPM can be easily deployed and is scalable. It can be deployed in a hierarchical fashion on the border/leaf routers, area border routers and/or on gateway/boundary routers. It does not need to be installed on all routers, interior routers in particular. The scheme is able to locate any source of a set of unsolicited or malicious packets or packets bearing illegal content with spoofed source IP addresses, not only those that are part of a DDoS attack.

Furthermore, BRPM does not need to be deployed by all ISPs to be effective. ISPs that are willing to provide service to prevent attacks that originate from within their domain can deploy the BRPM scheme on their border routers. In addition, the ISPs can protect their end-users/systems from attack originating from domains that do not employ BRPM by deploying the BRPM scheme on their area border routers or gateway/boundary routers.

Even though the BRPM scheme is a traceback scheme and not an intrusion detection mechanism, it offers the following valuable features for Intrusion Detection Systems (IDSs). Consider a received packet with an inscribed BRPM fragment whose bit positions are chosen from the network address portion (which is assumed to be shared by the source and its border router). An IDS operating at a server can immediately compare the corresponding bit positions of the received packet's source IP address with those of its inscribed fragment and deem that the packet has a spoofed source address if there is disagreement. In this way, the BRPM scheme is indirectly offering an ingress filtering feature.

Typically, DDoS attackers constantly change their source-IP addresses in order to confuse an IDS that is trying to determine which packets are malicious and which are legitimate. To render the IDS more effective, a simple log can be used to store the received fragments (i.e., the partial border routers' IP addresses and possibly partial hash values of the border routers' IP addresses) extracted from the received IP datagrams. This can be done in software or in hardware by using content addressable memories (CAM). Under a DDoS attack, an ICMP flood attack for instance, the IDS can easily log the "fragments" of all echo ICMP packets that are flooding the network and end-systems. Logging can be ordered first as per fragment ID and second as per marking information in that fragment instance. Under each fragment ID, the IDS keeps a count of the number of times a specific fragment instance occurred. If within a set amount of time the count is above a threshold, set for each fragment ID, the fragments are extracted and the reconstruction algorithm is applied. In that case, innocent users who might have sent echo ICMP messages won't be considered for reconstruction. Of course this method can be further used for TCP SYN attacks and any other DoS or DDoS attacks that are based on flooding a victim server with packets. For example, this method can be used in the case of TCP SYN attacks to reconstruct marking router addresses of half open connections.

Routing protocol attacks have become agenda items at public conferences such as DefCon, and Black Hat Briefings received reports of intruders using vendor-supplied default passwords on poorly configured and deployed routers to gain unauthorized access and control. Reports indicate routers are being used by intruders as platforms for scanning activity, as proxy points for obfuscating connections to IRC (Internet Relay Chat) networks, and as launch points for packet flooding DoS attacks. Of great concern is the potential use of compromised routers to attack the packet routing protocols (OSPF, BGP) themselves. Since router hijacking remains difficult, such attacks are rare however. The BRPM scheme can help prevent router hijacking, even if the potential intruder/hijacker has the correct password to gain control, by adding secure source-location information to the remote login process. That is, a router may allow remote login access only through a small pre-specified group of routers at the border of its trust region. This restricted access would be verified/enforced by the marking and address reconstruction of BRPM.

The BRPM Scheme can be efficiently used to trace back the source of e-mail spam. One scenario can be as follows. Once a number of email clients receive a spam, they notify their common mail server. As a consequence, the mail server starts tracing back the source of the spam. The traceback is done by having the mail server gather all the emails' packet that the clients identified as spam and extract the border routers' IP information residing in the overloaded fragment offset and unused bits. Since the mail server receives many spams per day (and consequently more fragments), it is able to reconstruct the IP addresses of the border routers from which the spams originated.

Security issues alone may justify the addition of a small field for BRPM in future versions of IP headers. Of course, any such additional field would, however, result in an overall reduction in transmission efficiency for the Internet.

As previously mentioned, the objective of packet marking schemes by routers is to stop DDoS attacks at their sources thereby preventing more malicious packets from reaching their targets. A victim will try to configure a selective packet filter as close as possible to the source of the DDoS attacks. Such a filter can be set up on the border/leaf routers, area border routers and/or on gateway/boundary routers. As a result of filtering, these routers will drop all packets destined to the victim. A more selective solution is to use firewalls in conjunction with an IDS. After an IDS determines what fragments need to be fed into the reconstruction algorithm, a firewall can set a filter to drop all packets that contain fragments that match those thus identified.

Clearly, such filters may themselves create a denial of service to innocent networks and their subscribers; however, such measures affect a substantially smaller portion of the Internet community. Some peripheral autonomous systems (e.g., an ISP) may not deploy BRPM and, therefore, BRPM would be resident in a gateway to the ISP. A firewall at the gateway would then create a DoS to all participants in the ISP, even those who are honestly trying to contact the victim server. This DoS would manifestly incentivize the ISP to accelerate deployment of BRPM in its border routers thereby negating the need for BRPM in the gateway and reducing the DoS effect of traceback and associated ingress filtering. By setting-up BRPM on trusted gateways, we can effectively deploy BRPM in an incremental manner. For example, a small-scale deployment of BRPM on gateways trusted by a security-sensitive server bank will have measurable benefits for the servers. The effect of such DoS "incentives" (a kind of Darwinian survival of the securest) will accelerate adoption of BRPM on a grander scale.

We have discussed an initial fragmentation scheme for marking in BRPM. In this section, we briefly describe previously proposed techniques for packet marking. These methods simultaneously attempt to reduce false positives and/or address reconstruction complexity. The problem here is how to segment a 32-bit source IP address into smaller fragments suitable for overloading the IPv4's 13-bit Fragmentation Offset field plus an unused Flag bit and the 2-bit TOS field, a total of 16 bits. The variable k will represent the total number of fragments or the number of fragments belonging to a single identified group spanning all bits of the IP address. Also, N will represent the number of different border router interfaces through which attacking packets enter the Internet, i.e., the number of different "attacking" border routers.

Two prominent varieties of packet marking have been proposed in association with PPM: Fragment Marking Scheme (FMS) and Advanced Marking Scheme (AMS). Under FMS, each router's IP address is bit interleaved with a "uniform hashed" version of the same address. The resulting 64-bit quantity is partitioned into k (non-overlapping) fragments. In the FMS packet marking approach, fragments are collected by a victim end-system under a DDoS attack and their contents are de-interleaved to obtain an IP address and hashed-value fragments. Complete 32-bit addresses and their hash values are reconstructed by simply concatenating the fragments. Finally, the hash function is applied to each reconstructed address to see if the result agrees with the corresponding reconstructed hash value. This last step has the effect of reducing false positives.

Under AMS, each router's IP address is hashed into an 11-bit or 8-bit value (according to whether AMS version I or II is used) and probabilistically inscribed in forwarded IP packets. However, unlike FMS, AMS requires the knowledge of a topological map of the Internet a priori to be able to reconstruct a 32-bit router IP address from the 11-bit or 8-bit hash values.

In the case of FMS, the address reconstruction of the routers' IP address is of the order $\theta(n^k)$. The number of false positives cannot be predicted but the number of reconstructed routers' IP addresses is $\theta(n^k)$. False positives are eliminated by recovering the IP address and its scrambled version and find a match. Note that in FMS, by using a 32-bit "hashed" IP address, k is 8.

In the case of AMS, the address reconstruction of the routers' IP address is clearly of the order $\theta(n)$. The number of false positives cannot be predicted but the number of reconstructed routers' IP addresses is $\theta(2^{32-f}n)$, where f is fragment size. False positives are eliminated by checking the reconstructed IP addresses with topological map of the Internet.

We previously associated a packet marking framework with BRPM in which a border router's IP address is fragmented (segmented) into several (k) overlapping fragments where each fragment has an identifying index (IDs 0 to k−1). Border routers write into the header (of every packet they forward) a selected fragment and its identifier (ID). The number of bits needed for storing both a fragment and its ID is at most $n+\lceil \log k \rceil$ (where n is the fragment size and k is the total number of fragments. Example fragmentation strategies are given in FIGS. 6, 8 and 10.

In the examples of marking strategies, fragments overlap, that is to say each fragment contains one or more bits that appear in another fragment. It should be noted, however, that the address fragments in the present techniques do not have to be overlapped. Overlapping considerably reduces the number of false positives and address reconstruction speed. Even without overlapping, our method is still unique because we need to reconstruct the fewer fragments, e.g. only the first 4 fragments instead of all the 8 fragments as would be the case with some earlier techniques.

The number of addresses produced by the reconstruction processing is reduced when overlapping fragments serve as the packet marks. The net effect of this fragment "redundancy" is to reduce false positives during the address reconstruction itself and, therefore, this process is less complex. More specifically, suppose an end-system is under a DDoS attack. Address reconstruction works as follows. The address fragments and their identifiers are extracted from the packet headers. Only pairs of fragments with identical (matching) overlapping fields are merged together to form a larger address "metafragment". Metafragments are then made even larger, according to this same rule, by continuing to merge them with other fragments whose overlapping fields agree with those of the metafragment.

We now specifically describe how false positives arise in the overlapping-fragments framework. Consider the simple example of two fragments (k=2) of n=20 bits that therefore overlap in 8 bit positions (FIG. 14). For a given 32-bit border router address A, let w(A) be this 8-vector of the overlapping bits
$f_i(A)$ be the fragment with ID i for i=0, 1
$b_i(A)$ be the 12-vector of non-overlapping bits of f(A)

We therefore write $f_i(A)=b_i(A) \oplus w(A)$, i.e., the ith fragment is composed of non-overlapping (unique to $f_i$) bits $b_i$ and the overlapping bits w. Now consider two logged fragments with different IDs, $f_0(A_0)$ and $f_1(A_1)$, where $A_0$ and $A_1$ are the actual IP addresses of border routers that marked the corresponding packets (of course, $A_0$ and $A_1$ are not known a priori to the entity performing traceback). If overlapping bits agree, i.e. $w(A_0)=w(A_1)=:W$, then the following 32-bit IP address will be reconstructed given fragment instances $f_0(A_0)$ and $f_1(A_1)$:

$$D_0 \equiv b_0(A_0) \oplus W \oplus b_1(A_1)$$
$$= b_0(A_0) \oplus f_1(A_1) = f_0(A_0) \oplus b_1(A_1)$$

Note that if $A_1=A_0$ (i.e., the two fragments under consideration are taken from the same address) then $D_0=A_0$ (i.e., the address is successfully reconstructed).

Consider two "attacking" border router IP addresses $A_0 \neq A_1$. Referring to FIG. 6, false positives are generated only when $w(A_0)=w(A_1)=:W$ and $b_0(A_0) \neq b_0(A_1)$
and $b_1(A_0) \neq b_1(A_1)$.

In this case, the two false positives generated are:
$F_0 \equiv b_0(A_0) \oplus W \oplus b_1(A_1)$
and $F_1 \equiv b_0(A_1) \oplus W \oplus b_1(A_0)$ In the following we will assume a victim server receives all fragments from all attacking routers; thus, there will be missed detections. Assume that a single group of overlapping-fragments approach is used and let:

φ be the number of fragments $\Omega_i$ be the set of fragments that overlap with fragment i $\omega_{i,j}$ be the number of overlapping bits between fragments i and j, if j∈$\Omega_i$ (note: $\omega_{i,j}=\omega_{j,i}$ V be the total number of bits that are used by just a single fragment (i.e., total "nonoverlapping" bits)

N be the number of "attacking addresses"

If we further assume that each fragment overlaps with exactly two other fragments and no single bit is shared by more than two fragments, then $N \leq \min_{i,j} 2^{w_{i,j}}$. The set of N attacking addresses are independently selected and follow a uniform distribution over the entire set of 32-bit IP addresses, then a simple formula for the probability of zero false positives is:

$$2^{VN}\left(\prod_{i=1}^{\phi}\prod_{j\in\Omega_i, j>i}\frac{2^{\omega_{i,j}}!}{(2^{\omega_{i,j}}-N)!}\right)\bigg/\left(\frac{2^{32N}!}{(2^{32N}-N)!}\right)$$

where we note that $$32 = V + \sum_{i=1}^{\phi}\sum_{j\in\Omega_i, j>i}\omega_{i,j}$$

The fragments must span the 32 different bits of an IP address. In particular, if $|\Omega_i|=2$ and a constant $\omega=\omega_{i,j}$ for all i and all j∈$\Omega_i$, then the probability of zero false positives is:

$$2^{32V}\left(\frac{2^{\omega}!}{2^{\omega}-N}\right)^{\phi}\bigg/\left(\frac{2^{32N}!}{2^{32N}-N}\right)$$

where V+ωφ=32.

The numbers of false positives using this overlapping technique alone are too high to be of practical value and requires too much address reconstruction complexity. In I. Hamadeh and G. Kesidis, *Packet marking for traceback of illegal content distribution*, in Proc. International Conference on Cross-Media Service Delivery (CMSD), ISBN 1-4020-7480-8, Santorini, Greece, May 31, 2003, we used the technique of fragment grouping to further reduce address reconstruction complexity (fewer reconstructed addresses) and false positives. Consider examples where the four overlapping fragments numbered 0-3 and those numbered 4-7 are respectively grouped together. The fragments in each group span the entire 32-bit address. In general, the previously described address reconstruction process will lead to a set $S_i$ of reconstructed 32-bit addresses using only those overlapping fragments whose IDs belong to the $i^{th}$ group. Using multiple fragment groups, only those reconstructed IP addresses that are common to all sets, i.e., those in $S \equiv S_1 \cap S_2 \cap S_3 \cap \ldots \cap S_n$ are deemed to be border routers through which originated transmission to the end-system performing traceback.

After running the simulation using the approach of multiple groups of overlapping fragments, all attacking border router IP addresses were successfully reconstructed along with small numbers of false positives: 2-4% for ≦400 attacking border routers and 65-70% for ≦700 attacking border routers. A final step to reduce false positives could be to check whether the reconstructed addresses are valid IP addresses (from assigned address subspaces). One could use the ping utility to check the validity of each reconstructed IP address. This approach would, however, create significant traffic volume if the number of reconstructed false positive addresses is in the tens of thousands or more. Alternatively, reliable communal registries of addresses of marking border routers could be maintained and lists of reconstructed addresses would be sent to such registries by victim end-systems for confirmation. If BRPM is deployed on a server-specific basis, the addresses reconstructed by a victim server could simply be checked against a list of marking routers at the periphery of the server's trust region, the list being stored at the server itself. In any case, it is clearly desirable from a real-time performance perspective to generate the least numbers of false positives as a result of the address reconstruction process.

As a further refinement of the marking strategy, we propose a hybrid marking strategy consisting of a single group of, say, four overlapping fragments spanning a 32-bit border router address. Now consider a "hash" function h that maps a 32-bit address A to an H-bit quantity h(A) where H≧32 (addresses may be initially padded with a known fixed suffix prior to application of the hash function). This H-bit quantity is then fragmented into k−4 fragments. To minimize false positives, the chosen hash function h should create very dissimilar (uncorrelated) values h(A) for addresses that are similar (correlated) in the domain of addresses under consideration.

With the hybrid marking, the address reconstruction works as follows. The address fragments and their identifiers are extracted from the packet headers. For the group of four overlapping fragments taken from the unmodified IP address, only pairs of fragments with identical (matching) overlapping fields are merged together to form a larger address "metafragment". Metafragments are then made even larger, according to this same rule, by continuing to merge them with other fragments whose overlapping fields agree with those of the metafragment. In addition, the hash fragments are stored. Once an address A is reconstructed, the hash function h is applied to it and the stored received fragments are searched to see if the fragments of h(A) have all been received. If all k−4 fragments of h(A) have been received, A is deemed to be an address of an "attacking" border router.

Note that, given the fragmentation strategy described above, there is a choice as to whether to attempt to reconstruct the hash quantities "h(A)" from their associated received fragments. Such a reconstruction process, however, will increase the complexity of address reconstruction. Also, simply checking whether the fragments of h(A) have been received (A being a reconstructed address) could be done very efficiently in hardware using a set of content addressable memories (CAMs), one for each of the k−4 fragment indexes associated with the hash value, see FIG. 15.

Note that we can easily modify the rule deeming an address to be "attacking" from requiring that all fragments of h(A) are present in the CAMs to requiring only that some or most are. This would result in fewer missed detections assuming that not all fragments from each attacking address have been received; on the other hand, more false positives will result. In any case and to reiterate, the assumption that all fragments have been received is not severe considering that there are only on the order of 16 different fragments per border router address.

While using non-overlapping fragments on h(A) may allow more of the hash value to be represented in the case where the fragment size is smaller than H/(k−4), overlapping fragments on h(A) may allow more correlation between fragments. In the different simulations we conducted, nonoverlapping fragments of the H-bit quantity yielded significantly more (sometimes by as much as 50%) false positives than overlapping fragments in this case.

Note that instead of using a hash function, it is possible to use one-to-one mapping scrambling functions. These functions would map a 32-bit IP address to another scrambled 32-bit quantity. An encryption (scrambling) algorithm such as the one used in Data Encryption Standard (DES) can be applied. The 32-bit IP address can first be padded to create a 64-bit quantity. Then the 64-bit quantity is scrambled with some given keys (the key can be fixed a priori or can be a padded version of the IP address). Moreover, an IP address can be scrambled in many different ways to generate multiple groups of scrambled quantity. Another approach might use the combination of part of the IP address bits with the hash attached to it but with the first four fragments either intact or scrambled To simplify the comparison between different address fragmentation strategies, evaluation was done in the context of the Border Router Packet Marking (BRPM) scheme. We used the MD5 message digest algorithm as our hash function h. MD5 is a secure hash function used to verify data integrity through the creation of a 128-bit message digest from data input. In addition to the uncorrelated and weakly correlated cases described at the end of Section 4.2, we generated "attacking" border router addresses that were strongly-correlated by fixing the leftmost 13 of the network address bits (e.g., assuming all attacks are emanating from border routers whose IP addresses fall within 200.0.0.0 and 200.7.255.255). Note that we assumed that the last 8 bits represent the host portion while the remaining 24 bits are the network portion.

Let f be the fragment size, k be the total number of fragments, and n be the number of "attacking" border routers. To test our proposed approach, we used the fragmentation framework of FIG. 8, varied the fragment size and the number of different fragments, assumed that all fragments from each attacking address were received by the victim end-system, and assumed the victim end-system employed a perfect intrusion detection, i.e., identified all attacking packets with no false positives. We report at most 1.0%±0.2 false positives (in the addresses} reconstructed and deemed to be attacking) with 95% confidence for the following values of n.

Case 1: f=13 and k=8 (16-bit mark). For mutually independent IP addresses between 0.1.0.0 and 223.255.255.0, n≦600. For weakly-correlated independent IP addresses between 200.0.0.0 and 200.255.255.255, n≦900. For strongly-correlated independent IP addresses between 200.0.0.0 and 200.7.255.255, n≦1500.

Case 2: f=12 and k=16 (16-bit mark). For mutually independent IP addresses between 0.1.0.0 and 223.255.255.0, n≦1500. For weakly-correlated independent IP addresses between 200.0.0.0 and 200.255.255.255, n≦2000. For strongly-correlated independent IP addresses between 200.0.0.0 and 200.7.255.255, we report 0% false positives observed in 15 separate trials for n≦2000.

Note that within each case, the more the border IP addresses are "correlated", the more the number of "attacking" border routers that can be resolve with the same false positive rate of 1%. This can be explained by taking note of the total number N of IP addresses reconstructed, i.e., from the group of four overlapping fragments of the unmodified IP address.

For instance, in case 2 and for n=1000, for mutually independent IP addresses between 0.1.0.0 and 223.255.255.0, N≈9.5 million IP addresses. For weakly-correlated independent IP addresses between 200.0.0.0 and 200.255.255.255, N≈0.29 million IP addresses. For strongly-correlated independent IP addresses between 200.0.0.0 and 200.7.255.255, N≈00.05 million IP addresses.

Hence, it is clear that the chance of generating a false positive is much higher in the case of mutually independent IP addresses than in the case of deterministically correlated (but otherwise independent) IP addresses.

Moreover, it is essential to note the performance of case 2 is much better than that of case 1. First, we report N for mutually independent IP addresses between 0.1.0.0 and 223.255.255.0 for case 1 and case 2 and then discuss the importance of the number of fragments k versus the fragment size f:

Case 1: For n=1000, N≈00.9 million IP addresses.
Case 2: For n=1000, N≈9.5 million IP addresses.

Although the number of reconstructed IP addresses of case 2 is approximately 10 times that of case 1 (because of case 2's smaller fragment size), case 2 yields better false positive results than case 1. This is due to the fact that in case 2, more bits are used to communicate the hashed address value. Case 1 uses only four fragments to cover part of the H-bit quantity h(A) while twelve fragments are used in case 2.

The speed of execution of the algorithm identifying attacking addresses depends on the fragment size f and the degree of correlation between border routers IP addresses. A larger fragment size (and correspondingly larger numbers of overlapping bits) results in fewer reconstructed IP addresses and, hence, a smaller execution time. Let t be the execution time in seconds to completely resolve all the "attacking" border routers' IP addresses, where all simulations were conducted on an 800 MHz Pentium III Linux workstation with 128 MB of RAM.

Case 1: f=13 and k=8. For mutually independent IP addresses between 0.1.0.0 and 223.255.255.0,
For n≦800, t≦1
For n≦1500, t≦9.
For weakly-correlated independent IP addresses between 200.0.0.0 and 200.255.255.255, t≦1 for n≦1500. For strongly-correlated independent IP addresses between 200.0.0.0 and 200.7.255.255, t≦1 for n≦1500.

Case 2: f=12 and k=16. For mutually independent IP addresses between 0.1.0.0 and 223.255.255.0,
For n≦400, t≦1
For n≦1500, t≦73.
For weakly-correlated independent IP addresses between 200.0.0.0 and 200.255.255.255, t≦1 for n≦1400. For strongly-correlated independent IP addresses between 200.0.0.0 and 200.7.255.255, t≦1 for n≦1500.

We considered the traceback problem of distributed denial-of-service attacks prevalent in the Internet today. In particular, a solution to this problem based on packet marking was described. We gave an overview of existing packet marking strategies and proposed a mechanism involving overlapping fragments of the unmodified marking router IP address along with fragments of a "scrambling hash" mapping of the address. At a victim end-system, reconstruction of the unmodified address is checked against received hash-value fragments. The hash function effectively decorrelates correlated "attacking" addresses causing false positives. Our approach was shown to produce less than 1% false positives for on the order of 1000 attacking routers' addresses. In addition, address reconstruction complexity is quite low.

Figure 3:
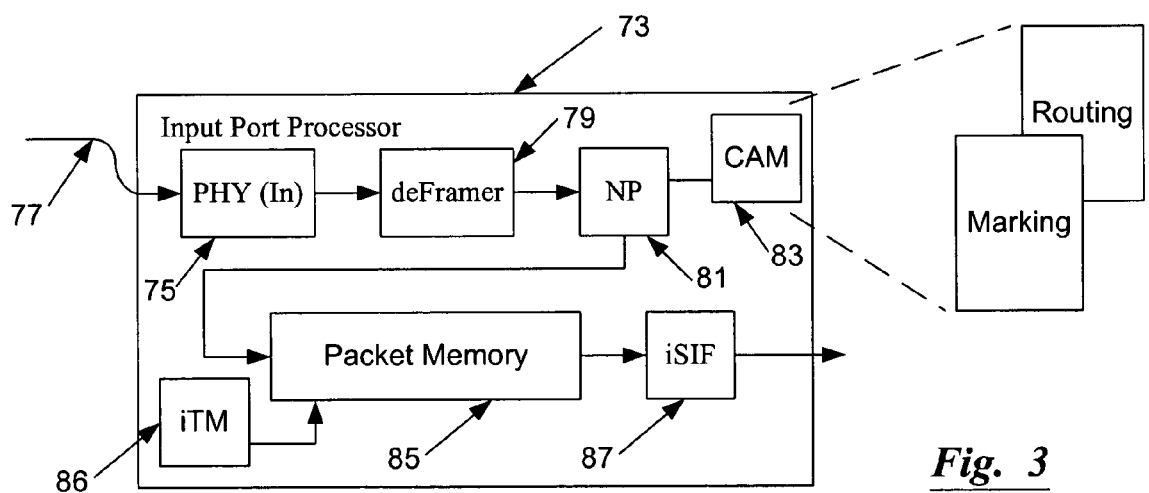
FIG. 3 is a simplified functional block diagram of an input port processor used in a line card of the router of FIG. 2.

Certain functionalities (e.g. marking and address reconstruction) involve processing in accord with appropriate programming, including executable code as well as associated stored data. Portions of the programming are executable by the marking border device (router or general-purpose computer), and other portions of the programming, e.g. for the reconstruction, are implemented by a server or other computer that functions as the particular administrator's computer, (FIGS. 2-3). In operation, the executable program code and possibly the associated data are stored within the general-purpose computer platform or in memory within the router. At other times, however, the code and/or data may be stored at other locations and/or transported for loading into the appropriate system. Hence, the examples involve one or more program products in the form of one or more modules of code carried by or in at least one machine-readable medium. Execution of such code by a processor in a router or by a processor of a computer platform enables the programmed device to implement the marking functions and/or the reconstruction operations in essentially the manner performed in the examples discussed and illustrated herein. Similar program execution allows a device to send requests to routers to initiate marking, send requests to network nodes to institute filtering, analyze marked packets to detect and trace back attacks, and take a variety of follow-up actions with regard to the different types of packet flows traced back to particular border devices.

Such program operations as described above may be carried out by execution of software, firmware, or microcode operating on a router or computer of any type. Additionally, code for implementing such operations may be in the form of computer instruction in any form (e.g., source code, object code, interpreted code, etc.) stored in or carried by any computer or machine readable medium As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in routers or in any computer(s) operating as one of the server platforms or user devices (see FIGS. 2-4). Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In the discussions above, examples are given of certain figures for numbers of fragments and size of fragments, etc. It should be noted, however, these are examples only, and the numbers could be modified and exactly the same techniques above would still be applied.

Those skilled in the art will recognize that additional variations are also encompassed by the above concepts. For example, if a separate system of n-bit router identifiers is used as an alternate type of addresses for marking purposes rather than IP addresses, where n is less that 32, then there will be no false positives when BRPM uses such identifiers. As another example, the BRPM strategies outlined above could include having the marking routers mark packets with (possibly fragments of) the IPv4 address of the input interface (input link) on which the packet arrived to the router. This later approach would provide an identification of the ingress port into the trusted region and thus an identification of a point that much closer to the actual source of a particular packet flow.

A separate system of n-bit router identifiers can be used along with one or multiple servers keeping a registry of the border routers' n-bit identifiers along with their associated (or related) IP addresses. Each border router may have an n-bit identifier associated with IPv4 address of the router's input interface (input link) (in that case a border router that has one or many IP addresses would be assigned one or many n-bit router identifier). On the other hand, an n-bit identifier may be associated with the border router itself irrespective of its input interface (in that case a border router that has one or many IP addresses would be assigned only one n-bit router identifier). To determine the border router IP address(es), a victim would require to contact the servers that keep a registry to resolve the n-bit border router identifier into the border router's IP address(es). From the marking routers perspective, the marking routers would be responsible for marking packets either differently for each micro-flow (i.e. by using the multiple fragment instances or multiple n-bit router identifiers) or similarly for each micro-flow (i.e. by using a single n-bit router identifier).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method for enabling identification of at least one address associated with ingress of a packet stream, comprising:

identifying a portion of a packet data communication network as a trusted region;

identifying all border devices at entry points on an outer boundary of the trusted region of the network;

configuring each respective one of the border devices to mark predetermined packets transmitted into the trusted region of the network, each marking of a packet by a respective border device comprising providing a fragment of a network address of the respective border device with the packet;

receiving a plurality of marked packets from one of the border devices; and processing address fragments from the received marked packets to reconstruct the network address of the one border device, wherein each respective one of the configured border devices performs the following steps:

fragmenting the address of the respective border device into a first plurality of overlapping fragments of a first format;

assigning fragment identifiers of a first range to the first plurality of fragments; and marking a first plurality of packets forwarded into the trusted region by including one of the first plurality of overlapping fragments and including a corresponding assigned fragment identifier of the first range in each of the first plurality of packets forwarded by the respective border device.

2. The method of claim 1, wherein the configuring step comprises causing each respective border device to mark all packets being transmitted into the trusted region of the network.

3. The method of claim 1, wherein the configuring step comprises causing each respective border device to mark all packets being transmitted to a predetermined destination through a region of the network trusted by the predetermined destination.

4. The method of claim 1, wherein the identified border devices comprise a plurality of routers of one or more autonomous systems of the packet data communication network.

5. The method of claim 4, wherein the packet data communication network is the Internet.

6. The method of claim 4, wherein the plurality of routers include routers on a backbone of one or more autonomous systems.

7. The method of claim 1, wherein each respective one of the configured border devices further performs the following steps:
fragmenting the address of the respective border device into a second plurality of overlapping fragments of a second format;
assigning fragment identifiers of a second range to the second plurality of fragments; and
marking a second plurality of packets forwarded into the trusted region by including one of the second plurality of overlapping fragments and including a corresponding assigned fragment identifier of the second range in each of the second plurality of packets forwarded by the respective border device.

8. The method of claim 7, wherein:
the first plurality of fragments are formatted to comprise sequential sections of the address of the respective border device having a predetermined number of bits of overlap between consecutive ones of the sequential sections; and
the second plurality of fragments are formatted so that each of the second plurality of fragments comprises two offset sections of the address of the respective border device, at least one pair of fragments included in the second plurality of fragments having a predetermined number of bits of overlap.

9. The method of claim 7, wherein the step of processing address fragments from the received marked packets to reconstruct the network address of the one border device comprises:
processing fragments from said plurality of marked packets received from the border device having identifiers in the first range to compare overlapped bits and combine fragments having matching overlapping bits to a form a first copy of the address of the one border device from the first fragments;
processing fragments from said plurality of marked packets received from the border device having identifiers in the second range to compare overlapped bits and combine fragments having matching overlapping bits to form a second copy of the address of the one border device from the first fragments; and
recognizing a valid reconstructed address if the first and second copies of the address of the one border device match.

10. The method of claim 1, wherein the predetermined packets include packets of a type selected from the group consisting essentially of: packets relating to a denial of service attack; packets containing spam e-mail messages; high volume traffic and packets containing illegally distributed content.

11. The method of claim 1, in combination with at least one step for imposing control on a flow of packets through the one border device whose network address was reconstructed from fragments in received marked packets.

12. The method of claim 11, wherein the at least one step of imposing control comprises causing the one border device to block transmission into the trusted region of the network of packets addressed to a predetermined destination.

13. The method of claim 1, wherein the packet data communication network transports Internet Protocol (IP) type packets comprising headers and data, and each marking of a packet comprises inserting the fragment of the network address of the respective border device into a predetermined field of the IP header of the marked packet.

14. The method of claim 13, wherein the predetermined field comprises a Fragmentation Offset field of the IP header.

15. The method of claim 13, wherein the predetermined field comprises a Identification field of the IP header.

16. The method of claim 13, wherein the predetermined field comprises a Fragmentation Offset field and the Identification field of the IP header.

17. The method of claim 16, wherein the fragments are portions of IP addresses.

18. A method of marking communication packets forwarded by a border device through a packet data communication network with router identifying information, comprising:
identifying a portion of a packet data communication network as a trusted region;
marking predetermined packets transmitted into the trusted region of the network by performing the steps of:
fragmenting a network address of the border device into a first plurality of overlapping address fragments of a first format;
assigning fragment identifiers of a first range to the first fragments; and
including one of the first plurality of fragments and including a corresponding assigned fragment identifier of the first range in each of a first plurality of packets forwarded by the border device.

19. The method of claim 18, further comprising:
fragmenting the network address of the border device into a second plurality of overlapping address fragments of a second format;
assigning fragment identifiers of a second range to the second fragments; and
including one of the second plurality of fragments and including a corresponding assigned fragment identifier of the second range in each of a second plurality of packets forwarded by the border device.

20. The method of claim 19, wherein:
the first plurality of address fragments are formatted to comprise sequential sections of the network address of the border device having a predetermined number of bits of overlap between consecutive ones of the sequential sections; and
the second plurality of address fragments are formatted so that each second address fragment comprises two offset sections of the address of the border device, at least one pair of fragments included in the second plurality of address fragments having a predetermined number of bits of overlap.

21. The method of claim 19, further comprising forming a hash value from each respective fragment, wherein when each respective fragment is included in a particular packet the hash value formed from the respective fragment is also included in the particular packet.

22. A method of reconstructing a network address of a packet marking device comprising:
receiving a first plurality of data packets containing marks comprising fragments of the network address of the packet marking device and respective fragment identifiers in a first range, via a packet data communication network;
for each respective fragment from the first plurality of data packets, comparing predetermined bits of the respective fragment to predetermined bits of one or more fragments from a first plurality of previously received packets, to determine if there is a match between the respective fragment and a fragment from one of the first plurality of previously received packets; and
for each match between a respective fragment from the first plurality of data packets and a fragment from the first plurality of previously received packets, concatenating one of the matching fragments with non-matched bits of the other one of the matching fragments,
wherein the matching and concatenation is performed until a combination of fragments produces the network address of the packet marking device that marked the first plurality of data packets.

23. The method of claim 22, wherein the network address is an Internet Protocol (IP) address of a router on a border of a trusted region of the packet data communication network.

24. The method of claim 23, wherein the packet data communication network is the Internet.

25. The method of claim 24, wherein the network address identifies an ingress point of the flow of packets representing an attack on at least one target served through the trusted region.

26. The method of claim 24, wherein the network address identifies an ingress point of a flow of packets containing spam e-mails.

27. The method of claim 24, wherein the network address identifies an ingress point of a flow of packets containing illegal information content.

28. The method of claim 22, wherein:
the matching and concatenation for the first plurality of data packets is performed on fragments assigned identifiers in the first range and produces a first version of the network address;
the method further comprises:
receiving a second plurality of data packets containing marks comprising fragments of the network address of the packet marking device and respective fragment identifiers in a second range, via the packet data communication network;
for each respective fragment from the second plurality of data packets containing a fragment identifier in the second range, comparing predetermined bits of the respective fragment to predetermined bits of one or more fragments from a second plurality of previously received packets carrying identifiers in the second range, to determine if there is a match between the respective fragment and a fragment from one of the second plurality of previously received packets; and
for each match between a respective fragment from the second plurality of data packets containing a fragment identifier in the second range and a fragment from the second plurality of previously received packets containing a fragment identifier in the second range, concatenating one of the matching fragments with non-matched bits the other one of the matching fragments,
wherein the matching and concatenation for fragments from packets containing fragment identifiers in the second range is performed until a combination of fragments produces a second version of the network address of the packet marking device that marked the second plurality of data packets.

29. The method of claim 28, further comprising validating the network address if the first version and the second version match.

30. The method of claim 22, further comprising:
for each received data packet containing a mark, recovering and storing a hash value related to a respective mark from the received data packet containing the respective mark;
upon deriving the network address, examining stored hash values corresponding to fragments used to derive the network address; and
identifying the network address as relating to a source of an attack if at least a predetermined number of hash values corresponding to fragments used to derive the network address have been received and stored.

31. The method of claim 30, wherein the step of examining comprises:
forming a hash of the network address;
fragmenting the hash of the network address; and
comparing the hash fragments to the stored hash values corresponding to fragments used to derive the network address.

32. A border device for communication through a packet data communication network, comprising:
a communication interface for enabling transmission of packets through the packet data communication network; wherein
the border device is programmed to receive packets from outside of a trusted region of the packet data communication network, mark predetermined ones of the received packets, and forward the marked packets into the trusted region by performing steps comprising:
a) fragmenting a network address of the border device into a first plurality of overlapping fragments of a first format;
b) assigning fragment identifiers of a first range to the first fragments;
c) including one of the first plurality of fragments and including a corresponding assigned fragment identifier of the first range in each of a first plurality of packets forwarded by the border device into the trusted region.

33. The border device as in claim 32, wherein the border device is a router comprising an input port processor in a line card of the router.

34. The border device as in claim 32, wherein the border device is a router comprising a content addressable memory for use in determining if individual packets should be marked.

35. The border device of claim 32, wherein the border device is further programmed to perform the steps of:
d) fragmenting the network address of the border device into a second plurality of overlapping fragments of a second format;
e) assigning fragment identifiers of a second range to the second fragments;
f) including one of the second plurality of fragments and including a corresponding assigned fragment identifier of the second range in each of a second plurality of packets forwarded by the border device.

36. A computer system programmed to implement a sequence of steps, to identify a packet marking device at or near a point of origin of a particular flow of packets through a packet data communication network, the sequence of steps comprising:

receiving data packets each containing a mark comprising a fragment of a network address of the device, via the packet data communication network;

for each respective fragment from a newly received packet, comparing predetermined bits of the respective fragment to predetermined bits of one or more fragments from previously received packets to determine if there is a match between the respective fragment and a fragment from a previously received packet; and for each match between a respective fragment from a newly received packet and a fragment from a previously received packet, concatenating one of the matching fragments with non-matched bits of the other one of the matching fragments, wherein the matching and concatenation is performed until a combination of fragments produces the network address of the packet marking device.

37. A computer program product comprising executable code embodied in a non-transitory machine-readable medium, execution of the code causing a computer to perform a sequence of steps to identify a device at or near a point of origin of a particular flow of packets through the network, the sequence of steps comprising:

receiving data packets containing marks comprising fragments of a network address, via the packet data communication network;

for each respective fragment from a newly received packet, comparing predetermined bits of the respective fragment to predetermined bits of one or more fragments from previously received packets to determine if there is a match; and for each match between a respective fragment from a newly received packet and a fragment from a previously received packet, concatenating one of the matching fragments with non-matched bits of the other one of the matching fragments, wherein the matching and concatenation is performed one or more times until a combination of fragments produces a complete address of a device that marked a plurality of the received packets.

* * * * *